United States Patent
Sasaki et al.

(10) Patent No.: US 7,248,947 B2
(45) Date of Patent: Jul. 24, 2007

(54) INFORMATION-SHARING SYSTEM, INFORMATION-SHARING SERVER, INFORMATION-SHARING METHOD, AND INFORMATION-SHARING PROGRAM

(75) Inventors: Hiroshi Sasaki, Tokyo (JP); Hirotoshi Iwasaki, Tokyo (JP); Osamu Masutani, Tokyo (JP); Shinichi Honiden, Tokyo (JP); Nobukazu Yoshioka, Tokyo (JP); Yasushi Ando, Tokyo (JP)

(73) Assignee: Denso IT Laboratory, Inc. and Research Organization of Information and Systems of C/O National Institute of Informatics, Tokyo (JP)

( * ) Notice: Subject to any disclaimer, the term of this patent is extended or adjusted under 35 U.S.C. 154(b) by 297 days.

(21) Appl. No.: 11/085,546

(22) Filed: Mar. 22, 2005

(65) Prior Publication Data

US 2006/0178788 A1 Aug. 10, 2006

(30) Foreign Application Priority Data

Jan. 21, 2005 (JP) ............................. 2005-014895

(51) Int. Cl.
- G06F 17/00 (2006.01)
- G01S 1/00 (2006.01)
- G08G 1/123 (2006.01)

(52) U.S. Cl. .................... 701/1; 701/200; 342/357.1; 340/988

(58) Field of Classification Search .................... 701/1, 701/200; 342/357.08, 357.09, 357.1; 340/988
See application file for complete search history.

(56) References Cited

U.S. PATENT DOCUMENTS

| | | | | |
|---|---|---|---|---|
| 6,654,883 | B1 * | 11/2003 | Tatebayashi | 713/168 |
| 6,721,632 | B2 * | 4/2004 | Fallenstein | 701/1 |
| 6,791,475 | B2 * | 9/2004 | Yamashita | 340/935 |
| 6,865,458 | B1 * | 3/2005 | Kim | 701/36 |
| 7,010,583 | B1 * | 3/2006 | Aizono et al. | 709/219 |
| 7,135,993 | B2 * | 11/2006 | Okamoto et al. | 340/995.1 |

FOREIGN PATENT DOCUMENTS

JP 2002-245212 8/2002

* cited by examiner

*Primary Examiner*—Y Beaulieu
(74) *Attorney, Agent, or Firm*—Louis Woo

(57) ABSTRACT

A technique to provide an information-sharing system and the like is disclosed. According to this technique, there are provided an on-board information terminal to transmit one or more types of information among a vehicle information relating to user's own vehicle and on-board program information to acquire shared information, an area information acquiring system for acquiring area information, and an information-sharing server for calculating time function existing quantity based on time function according to one or more types of information among vehicle information and area information, calculates time function transmission quantity based on time function including the calculated time function existing quantity, arranges the calculated time function existing quantity and the time function transmission quantity to a corresponding position on a map, attaches the map information to the on-board program information, and transmits it to the on-board information terminal.

26 Claims, 14 Drawing Sheets

INFORMATION-SHARING SYSTEM, INFORMATION-SHARING SERVER, INFORMATION-SHARING METHOD, AND INFORMATION-SHARING PROGRAM

BACKGROUND OF THE INVENTION

1. Field of the Invention

The present invention relates to an information-sharing system, an information-sharing server, an information-sharing method, and an information-sharing program, by which information can be shared among a plurality of users.

2. Description of the Prior Art

In the information-sharing system to share information as used in the past, various types of information obtained from a plurality of users or information acquired from outside are provided to other users, and the information acquired is stored in a predetermined storage area. A conventional system for sharing information is disclosed in the patent reference 1 as given below:

Patent reference 1: JP-A-2002-245212 Publication (Paragraph-0008)

However, in the system as disclosed in the patent reference 1, the acquired information is accumulated in a predetermined storage area, while most of the types of information thus accumulated are usually the information, which is not always needed or which has no value to use any more. To accumulate these types of information, which have no value to use any more means useless storage of resources. To eliminate such useless storage of resources, these useless types of information are usually deleted either periodically or non-periodically, while this requires troublesome procedure. Also, there is a problem in that these useless types of information cannot be deleted at real time. This means that the types of information with low reliability in information up-to-datedness (freshness) are continuously stored.

SUMMARY OF THE INVENTION

To solve the above problems, it is an object of the present invention to provide an information-sharing system, an information-sharing server, an information-sharing method, and an information-sharing program, by which it is possible to offer the latest information with high reliability of information up-to-datedness, and to delete useless information at real time without requiring troublesome procedure to delete.

To attain the above object, the present invention provides an information-sharing system, which comprises an on-board information terminal provided on a vehicle, said on-board information terminal transmits at least one or more types of information among an on-board program information to acquire vehicle information relating to user's own vehicle and a shared information useful for driving of said vehicle;

an area information acquiring system for acquiring an area information, which is an information on traffic condition on a driving road of said vehicle and in the surrounding of said driving road; and an information-sharing server for acquiring number of vehicles and for calculating time function existing quantity based on time function including said acquired existing quantity according to at least one or more types of information among said area information received from said area information acquiring system, and said vehicle information received from said on-board information terminal, and said information-sharing server further calculates time function transmission quantity to be transmitted to adjacent area as time elapses based on time function including said calculated time function existing quantity, arranges the calculated time function existing quantity and the time function transmission quantity at a corresponding position on a finely divided map, and when said on-board program information is received from said on-board information terminal, map information of said map, where said time function existing quantity and said time function transmission quantity are arranged is attached, to said on-board program information and is transmitted to said on-board information terminal. Here, the on-board information terminal may be a portable information terminal such as handy phone terminal, PDA (Personal Digital Assistant) terminal, etc.

Also, according to a preferred aspect of the present invention, an information-sharing system as described above is provided, wherein said area information includes quantity of exhaust gas and information on traffic quantity of pedestrians and other persons; and said information-sharing server acquires number of vehicles and quantity of persons, vehicles and exhaust gas based on at least one or more types $5f$ said vehicle information received from said on-board information terminal and said area information received from said area information acquiring system, and calculates time function existing quantity based on time function including said acquired existing quantity.

Further, the present invention provides an information-sharing server, which comprises receiving means for receiving at least one or more types of information among a vehicle information on a vehicle from outside, an on-board program information to acquire shared information useful for driving of said vehicle, and an area information, which is an information on traffic quantity on a driving road of said vehicle and in the surrounding of said driving road;

calculating means for acquiring existing quantity of vehicles based on at least one or more types information among said vehicle information received by the receiving information means and said area information, calculating time function existing quantity based on time function including said acquired existing quantity, and calculating time function transmission quantity to be transmitted to adjacent area as time elapses based on the time function including said calculated time function existing quantity;

arranging means for arranging said time function existing quantity and said time function transmission quantity calculated by said calculating means to a corresponding position on a finely divided map;

attaching means for attaching map information of said map, where said time function existing quantity and said time function transmission quantity are arranged by said arranging means, to said on-board program information when said on-board program information is received by said receiving means; and transmitting means for transmitting said on-board program information, where said map information is attached by said attaching means, to said outside.

Also, according to a preferred aspect of the present invention, the information-sharing server as described above is provided, wherein said receiving means receives at least one or more types of information among a vehicle information relating to the vehicle from outside and an on-board program information to acquire shared information useful for driving said vehicle and area information, which is an information on traffic quantity on a driving road of said vehicle and in the surrounding of said driving road, and traffic quantity exhaust gas existing quantity and information on traffic quantity of pedestrians and other persons; and said calculating means acquires existing quantity of vehicles and existing quantity of persons, vehicles and exhaust gas based on at least one or more types of information including said vehicle information and said area information received by said receiving means, and calculates time function existing quantity based on time function including said acquired existing quantity.

Further, the present invention provides an information-sharing method, which comprises the steps of:

receiving at least one or more types of information among a vehicle information relating to a vehicle from outside, an on-board program information to acquire shared information useful for driving of said vehicle, and an area information, which is an information on traffic quantity of a driving road of said vehicle and in the surrounding of the driving road;

acquiring existing quantity of vehicles based on at least one or more types of information among said received vehicle information and said area information, calculating time function existing quantity based on time function including said acquired existing quantity, and calculating time function transmission quantity to be transmitted to adjacent area as time elapses based on time function including the calculated time function existing quantity;

arranging said calculated time function existing quantity and said time function transmission quantity to a corresponding position on a finely divided map;

attaching map information of said map, where said time function existing quantity and said time function transmission quantity are arranged, to said on-board program information; and transmitting said on-board program information, where said map information is attached, to said outside.

Also, according to a preferred aspect of the present invention, the information-sharing method as described above is provided, wherein said method further comprises the steps of receiving, in said receiving step, at least one or more types of information among a vehicle information relating to a vehicle from outside, an on-board program information to acquire shared information useful for driving of said vehicle, and an area information on traffic quantity on a driving road of said vehicle and in the surrounding of the driving road, existing quantity of exhaust gas, and on traffic quantity of pedestrians and other persons; and acquiring, in said calculating step, existing quantity of vehicles or existing quantity of persons, vehicles and exhaust gas based on at least one or more types of information among said received vehicle information and said area information, and calculating time function existing quantity based on time function including said acquired existing quantity.

Further, the present invention provides an information-sharing program for instructing a computer to execute the steps of:

receiving at least one or more types of information among a vehicle information relating to a vehicle from outside, an on-board program information to acquire the shared information useful for driving of said vehicle, and an area information, which is an information on traffic quantity of a driving road of said vehicle and in the surrounding of the driving road;

acquiring existing quantity of vehicles based on at least one or more types of information among said received vehicle information and said area information, calculating time function existing quantity based on time function including said acquired existing quantity, and calculating time function transmission quantity to be transmitted to adjacent area as time elapses based on time function including said calculated time function existing quantity;

arranging said calculated time function existing quantity and said time function transmission quantity to a corresponding position on a finely divided map;

attaching map information of said map, where said time function existing quantity and said time function transmission quantity are arranged, to the on-board program information when said on-board program information is received from said outside; and transmitting said on-board program information, where said map information is attached, to said outside.

Also, according to a preferred aspect of the present invention, the information-sharing program as described above is provided, wherein said program further comprises the steps of receiving, in said receiving step, at least one or more types of information among a vehicle information relating to the vehicle from outside, an on-board program information to acquire shared information useful for driving of said vehicle, and an area information, which is an information on traffic quantity on a driving road of said vehicle and in the surrounding of said driving road, and traffic quantity existing quantity of exhaust gas and traffic quantity of pedestrians and other persons; and acquiring existing quantity of vehicles or existing quantity of persons, vehicles and exhaust gas based on at least one or more types of information among said received vehicle information and said area information, and calculating time function existing quantity based on time function including said acquired existing quantity.

Further, the present invention provides an information-sharing system, which comprises:

an information device for transmitting an information device program information to acquire shared information useful for service utilization;

an area information acquiring system to acquire an area information, which is an information of traffic quantity on a driving road of a vehicle and in the surrounding of the driving road; and an information-sharing server for acquiring existing quantity of vehicles based on at least one or more types of information among said area information received from said area information acquiring system, calculating time function existing quantity based on time function including said acquired existing quantity, calculating time function transmission quantity to be transmitted to adjacent area as time elapses based on time function including said calculated time function existing quantity, arranging said calculated time function existing quantity and said time function transmission quantity to a corresponding position on a finely divided map, attaching map information of said map, where said time function existing quantity and said time function transmission quantity are arranged, to said information device program information when said information device program information is received from said information device.

Also, according to a preferred aspect of the present invention, the information-sharing system as described above is provided, wherein said area information includes information of exhaust gas existing quantity and traffic quantity of pedestrians and other persons; and said information-sharing server acquires existing quantity of vehicles based on at least one or more types of information among said area information received from said area information acquiring system, acquires existing quantity of the vehicles, and calculates time function existing quantity based on time function including said acquired existing quantity.

Further, the present invention provides an information-sharing server, which comprises:

receiving means for receiving an information device program, an information to acquire shared information useful for service utilization from outside and an area information, which is an information on traffic quantity on a driving road of the vehicle and in the surrounding;

calculating means for acquiring existing quantity of vehicles based on said area information received by said receiving means, calculating time function existing quantity based on time function including said acquired existing quantity, and calculating time function transmission quantity to be transmitted to adjacent area as time elapses based on time function including said calculated time function existing quantity;

arranging means for arranging said calculated time function existing quantity and said time function transmission quantity calculated by said calculating means to a corresponding position on a finely divided map;

attaching means for attaching map information of said map, where said time function existing quantity and said time function transmission quantity are arranged by said arranging means, to said information device program information; and transmitting means for transmitting said information device program information, where said map information is attached by said attaching means, to said outside.

Also, according to a preferred aspect of the present invention, the information-sharing server as described above is provided, wherein said receiving means receives the information device program information to acquire shared information useful for service utilization from outside, and an area information, which is an information on traffic quantity on a driving road of a vehicle and in the surrounding of the driving road, and traffic quantity of pedestrians and other persons; and said calculating means acquires existing quantity of persons, vehicles and exhaust gas based on said area information received by said receiving means and calculates time function existing quantity based on time function including said acquired existing quantity.

Further, the present invention provides an information-sharing method, which comprises the steps of receiving an information device program information to acquire shared information useful for service utilization from outside and an area information, which is an information on a driving road of the vehicle and on traffic quantity in the surrounding of the driving road;

acquiring the existing quantity of vehicles based on said received area information, calculating time function existing quantity based on time function including said acquired existing quantity and time function transmission quantity to be transmitted to adjacent area as time elapses based on time function including said calculated time function existing quantity;

arranging said calculated time function existing quantity and said time function transmission quantity to a corresponding position on a finely divided map;

attaching map information on said map, where said time function existing quantity and said time function transmission quantity are arranged, to said information device program information; and transmitting said information device program information, where said map information is attached, to said outside.

Also, according to a preferred aspect of the present invention, the information-sharing method as described above is provided, wherein said method further comprises the steps of receiving, in said receiving step, the information device program information to acquire shared information useful for service utilization from outside and an area information, which is an information on traffic quantity on a driving road of the vehicle and in the surrounding of the driving road and on exhaust gas existing quantity and traffic quantity of pedestrians and other persons; and acquiring, in the calculating step, the existing quantity of persons, vehicles, and exhaust gas based on said received area information, and calculating time function existing quantity based on time function including said acquired existing quantity.

Further, the present invention provides an information-sharing program to instruct a computer to execute the steps of:

receiving an information device program information to acquire shared information useful for service utilization from outside and an area information, which is an information on traffic condition on a driving road of a vehicle and in the surrounding of the driving road;

acquiring existing quantity of vehicles based on said received area information, calculating time function existing quantity based on time function including said acquired existing quantity, and calculating time function transmission quantity to be transmitted to adjacent area as time elapses based on time function including said calculated time function existing quantity;

arranging said calculated time function existing quantity and said time function transmission quantity to a corresponding position on a finely divided map;

attaching map information of said map, where said time function existing quantity and said time function transmission quantity are arranged, to said information device program information when said information device program information is received from said outside; and transmitting said information device program information, where said map information is attached, to said outside.

Also, according to a preferred aspect of the present invention, the information-sharing program as described above is provided, wherein said program further comprises the steps of receiving, in said receiving step, an information device program to acquire shared information useful for service utilization from outside, and an area information on traffic quantity on a driving road of the vehicle and in the surrounding of the driving road, exhaust gas existing quantity, and traffic quantity of pedestrians and other persons; and acquiring existing quantity of persons, vehicles, and exhaust gas based on said received area information, and calculating time function existing quantity based on time function including said acquired existing quantity.

Further, the present invention provides an information-sharing system, which comprises an area information acquiring system for acquiring an area information, which is an information of traffic quantity on a driving road and in the surrounding of the driving road; and an on-board information terminal for acquiring existing quantity of the vehicles based on said area information acquired by said area information acquiring system, calculating time function existing quantity based on time function including said acquired existing quantity, calculating time function transmission quantity transmitted from adjacent area as time elapses based on a preset time function, and arranging said calculated time function existing quantity, said time function transmission quantity, and time function remaining quantity previously arranged and currently remaining to a corresponding position on a finely divided map.

Also, according to a preferred aspect of the invention, the present invention provides an information-sharing system as described above, wherein said area information includes exhaust gas existing quantity and traffic quantity of pedestrians and other persons; and said on-board information terminal acquires existing quantity of vehicles and existing quantity of persons, vehicles, and exhaust gas based on said area information acquired by said area information acquiring system, and calculating time function existing quantity based on time function including said acquired existing quantity.

Further, the present invention provides an information-sharing system, which comprises an on-board information terminal provided on a vehicle for transmitting a vehicle information relating to user's own vehicle;

an area information acquiring system for receiving said vehicle information transmitted by said on-board information terminal, and acquiring an area information, which is an information of traffic quantity on a driving road of said vehicle and in the surrounding of the driving road; and an information-sharing server for acquiring existing quantity of vehicles based on at least one or more types of information among said vehicle information received from said area information acquiring system and said area information, calculating time function existing quantity based on time function including said acquired existing quantity, calculating time function transmission quantity to be transmitted from adjacent area as time elapses based on a preset time function, arranging said calculated time function existing quantity, said time function transmission quantity, and time function remaining quantity previously arranged and currently remaining to a corresponding position on a finely divided map, and transmitting map information of said arranged map to said on-board information terminal.

Also, according to a preferred aspect of the preset invention, the information-sharing system as described above is provided, wherein said information-sharing server acquires existing quantity of vehicles and existing quantity of persons, vehicles and exhaust gas based on at least one or more types of information among said vehicle information received from said area information acquiring system and said area information, and calculates time function existing quantity based on time function including said acquired existing quantity.

Further, the present invention provides an information-sharing system, which comprises an on-board information terminal provided on a vehicle to transmit a vehicle information relating to user's own vehicle; and an area information acquiring system for receiving said vehicle information transmitted by said on-board information terminal, acquiring an area information, which is an information of traffic quantity on a driving road of said vehicle and traffic quantity in the surrounding of the driving road, acquiring existing quantity of vehicles based on at least one or more types of information among said vehicle information and said area information, calculating time function existing quantity based on time function including said acquired existing quantity, calculating time function transmission quantity to be transmitted from adjacent area as time elapses based on a preset time function, arranging said calculated time function existing quantity, said time function transmission quantity and time function remaining quantity previously arranged and currently remaining to a corresponding position on a finely divided map, and transmitting map information of said arranged map to said on-board information terminal.

Also, according to a preferred aspect of the present invention, the information-sharing system as described above is provided, wherein said area information acquiring system receives said vehicle information transmitted by said on-board information terminal, acquires an area information, which is an information of traffic quantity on a driving road of said vehicle and in the surrounding of said driving road, acquires existing quantity of vehicles and existing quantity of persons, vehicles and exhaust gas based on at least one or more types of information among said vehicle information and said area information, and calculates time function existing quantity based on time function including said acquired existing quantity.

Further, the present invention provides an information-sharing system, which comprises an area information providing terminal for acquiring an area information, which is an information on traffic quantity on a driving road of a vehicle and in the surrounding of the driving road; and an information providing server for acquiring existing quantity of vehicles based on said area information transmitted from said area information providing terminal, calculating time function existing quantity based on time function including said acquired existing quantity, calculating time function transmission quantity transmitted from adjacent area as time elapses based on a preset time function, arranging said calculated time function existing quantity, said time function transmission quantity and time function remaining quantity, previously arranged and current remaining, to a corresponding position on a finely divided map, and transmitting map information of said map where the data are arranged to an on-board information terminal provided on the vehicle being driven on said driving road.

Also, according to an aspect of the present invention, the information-sharing system as described above is provided, wherein said area information providing terminal acquires an area information, which is an information of traffic quantity on a driving road of the vehicle and in the surrounding of the driving road, and traffic quantity of pedestrians and other persons, and transmits said acquired area information to outside; and said information providing server acquires existing quantity of the vehicles and existing quantity of persons, vehicles and exhaust gas based on said area information transmitted from said area information providing terminal, and calculating time function existing quantity based on time function including said acquired existing quantity.

Further, the present invention provides an information-sharing system, which comprises an on-board information terminal provided on a vehicle to transmit a vehicle information relating to user's own vehicle; and an information providing terminal provided on another vehicle other than said vehicle and for receiving said vehicle information transmitted from said on-board information terminal in case said another vehicle is driven in a predetermined area, acquires existing quantity of the vehicles based on said vehicle information, calculates time function existing quantity based on time function including said acquired existing quantity, calculates time function transmission quantity to be transmitted from adjacent area as time elapses based on a preset time function, arranges said calculated time function existing quantity, said time function transmission quantity, and time function remaining quantity, previously arranged and currently, remaining to a corresponding position on a finely divided map, and transmits map information of said map where the data are arranged to said on-board information terminal.

Also, according to a preferred aspect of the present invention, the information-sharing system as described above is provided, wherein said information providing terminal is provided on a vehicle other than said vehicle, receives said vehicle information transmitted from said on-board information terminal in case said other vehicle is driven in a predetermined area, acquires existing quantity of the vehicles or existing quantity of persons, vehicles and exhaust gas, and calculates time function existing quantity based on time function including said acquired existing quantity.

The information-sharing system, the information-sharing server, the information-sharing method, and the information-sharing program according to the present invention have the features as described above. Thus, by these systems, it is possible to provide the latest information with high reliability in information up-to-datedness, and to delete useless information at real time and without requiring troublesome procedure.

DETAILED DESCRIPTION OF THE PREFERRED EMBODIMENTS OF THE INVENTION

1st Embodiment

Figure 1:
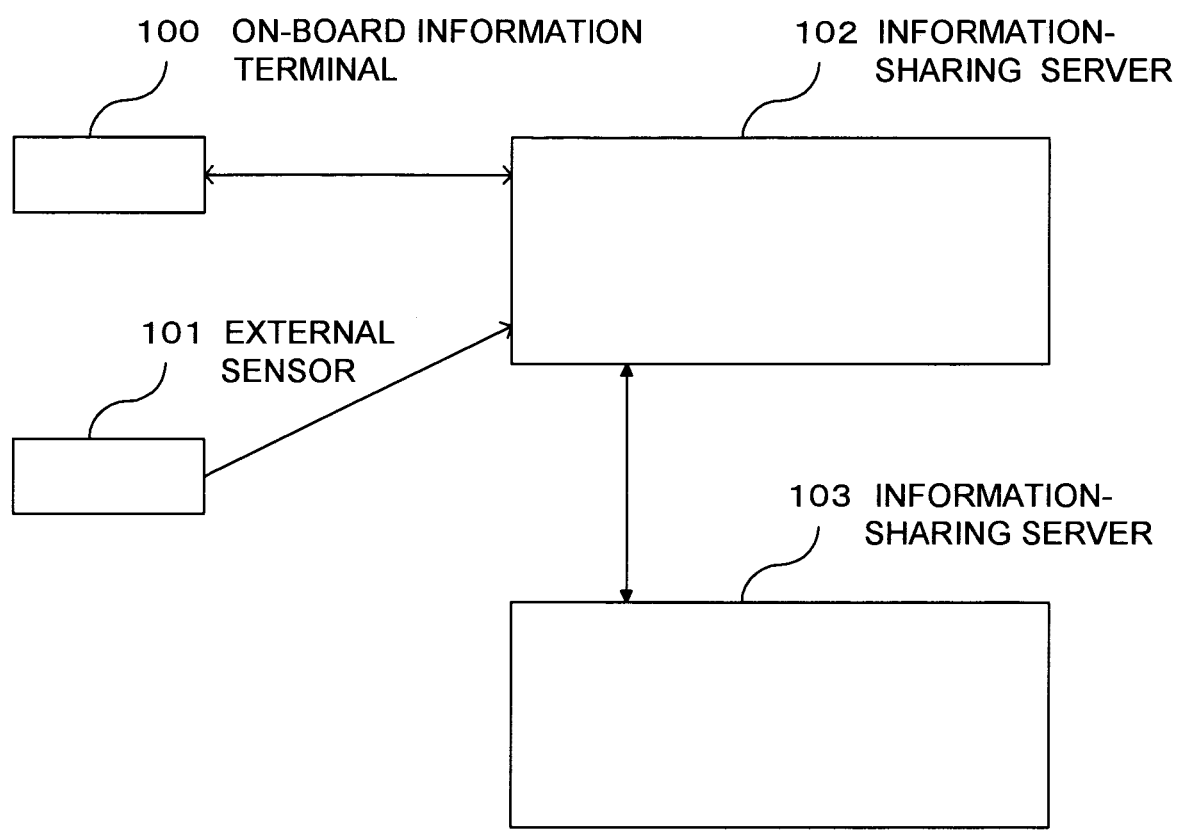
FIG. 1 is a schematical drawing to show an arrangement of an information-sharing system of a first embodiment of the present invention.
Figure 2:
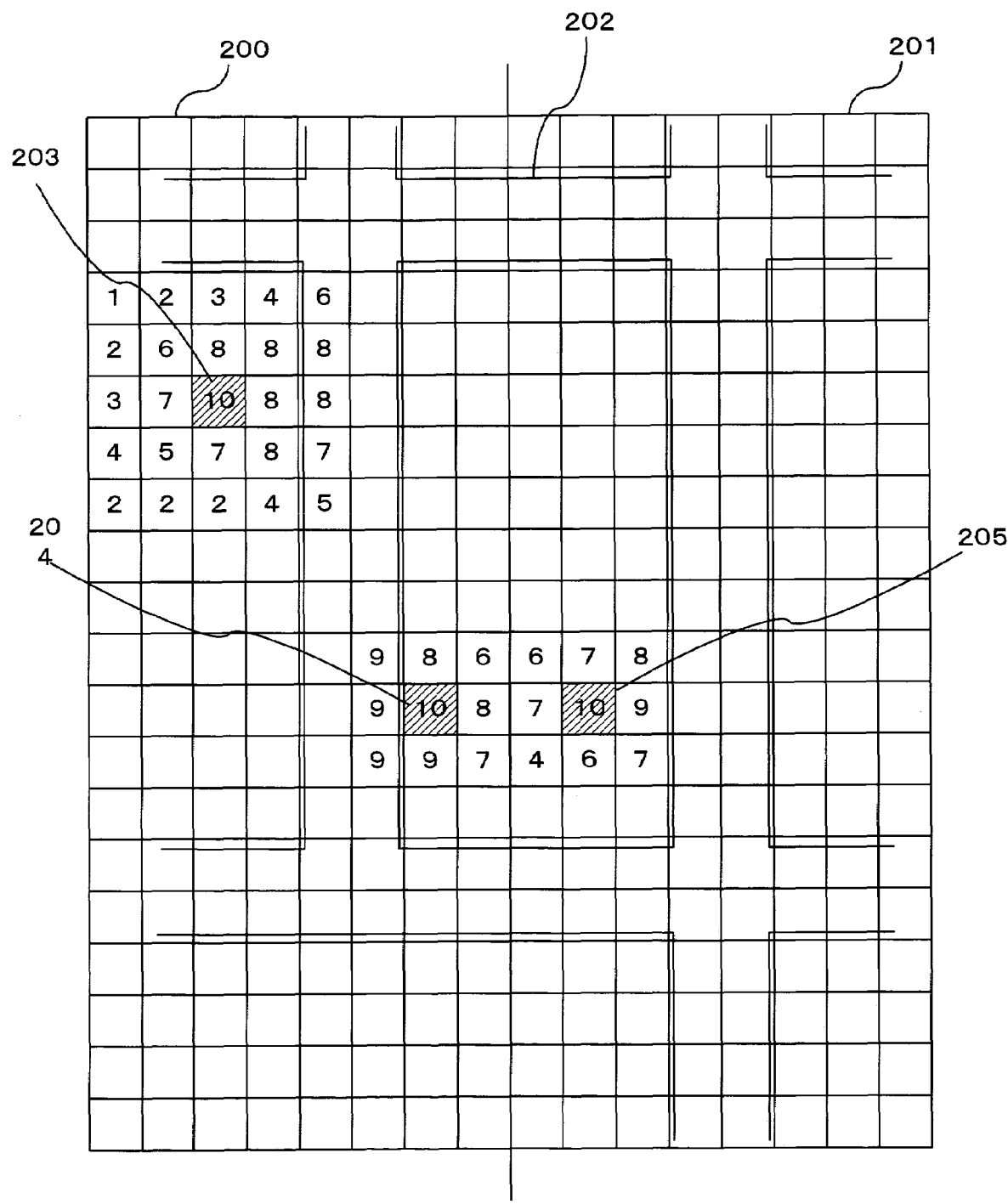
FIG. 2 is a diagram to explain a concrete example in case the digitized information intensity in an information-sharing server is reflected on a map in the first embodiment of the present invention.
Figure 3A:
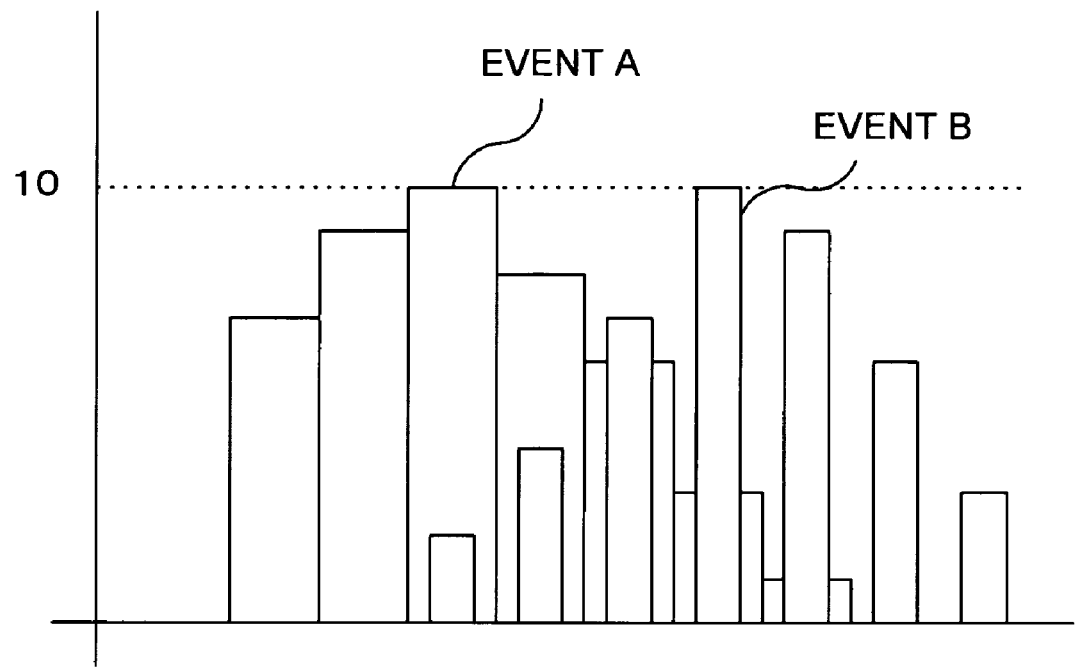
FIG. 3A is a histogram to show information intensity in an information transmission program field and in its surrounding in an information-sharing server in the first embodiment of the present invention.
Figure 3B:
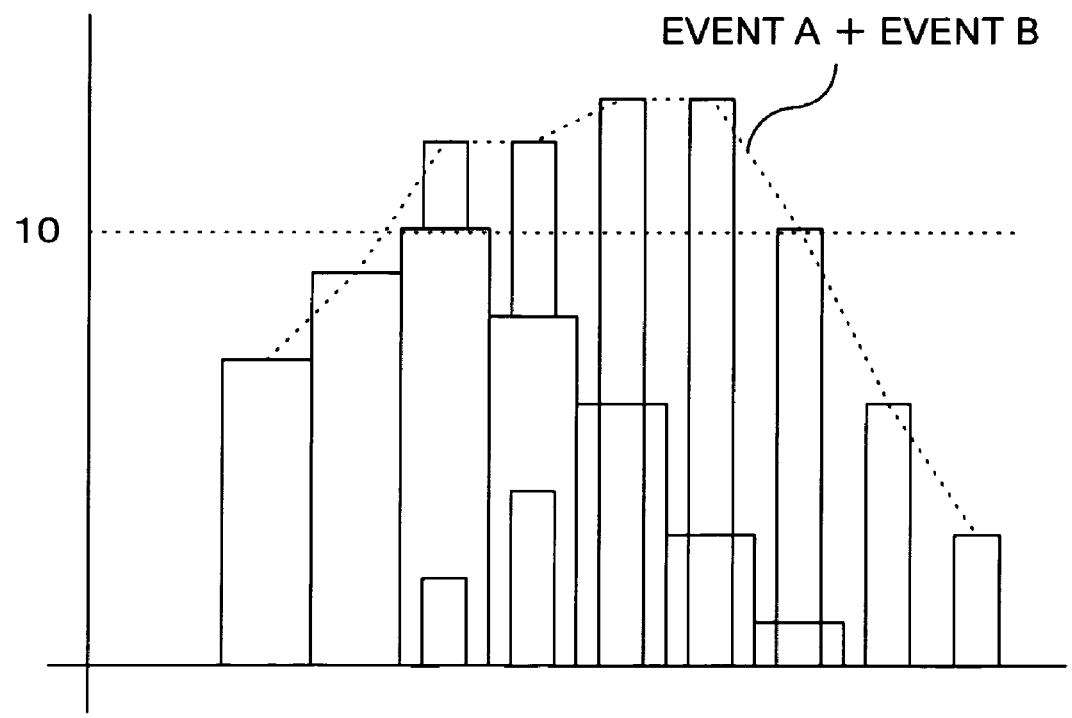
FIG. 3B is a histogram to show information intensity in an information transmission program field and in its surrounding in the information-sharing server in the first embodiment of the present invention.
Figure 4:
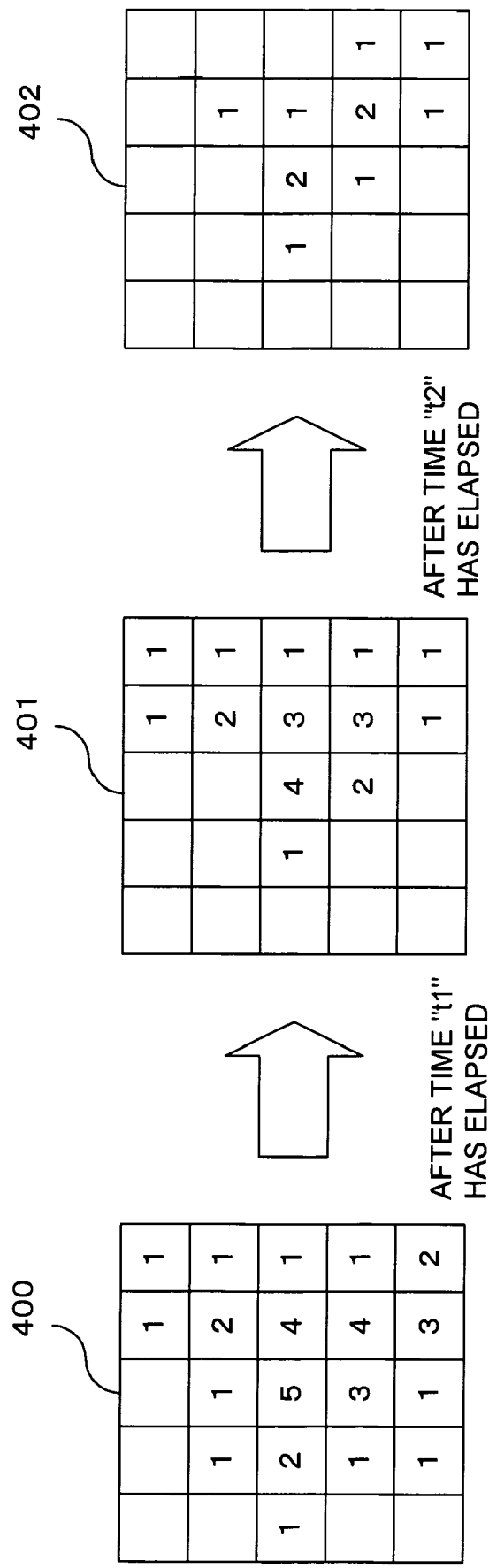
FIG. 4 represents diagrams to explain information intensity, which is attenuated as time elapses, in the information-sharing server in the first embodiment of the present invention.
Figure 5:
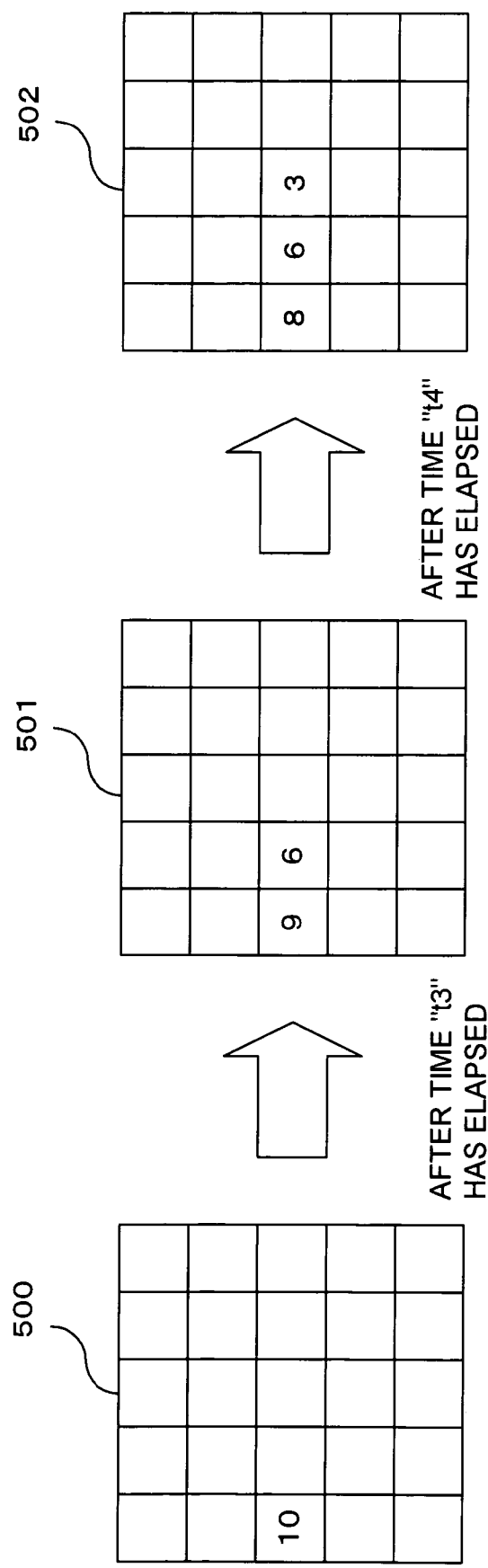
FIG. 5 represents diagrams to explain information intensity to be transmitted to adjacent information transmission program field or to the information-sharing server as time elapses in the information-sharing server in the first embodiment of the present invention.
Figure 6:
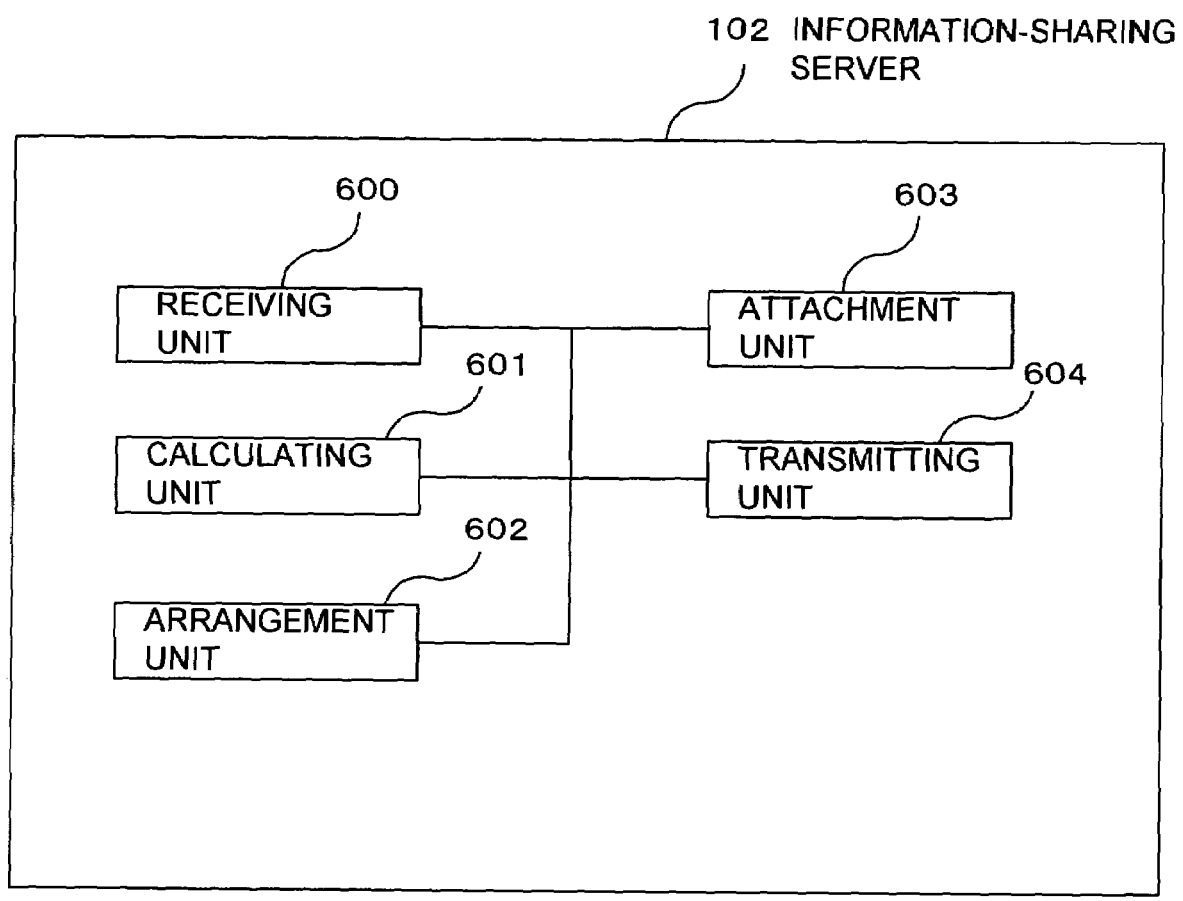
FIG. 6 is a drawing to show an arrangement of an information-sharing server in the first embodiment of the present invention.
Figure 7:
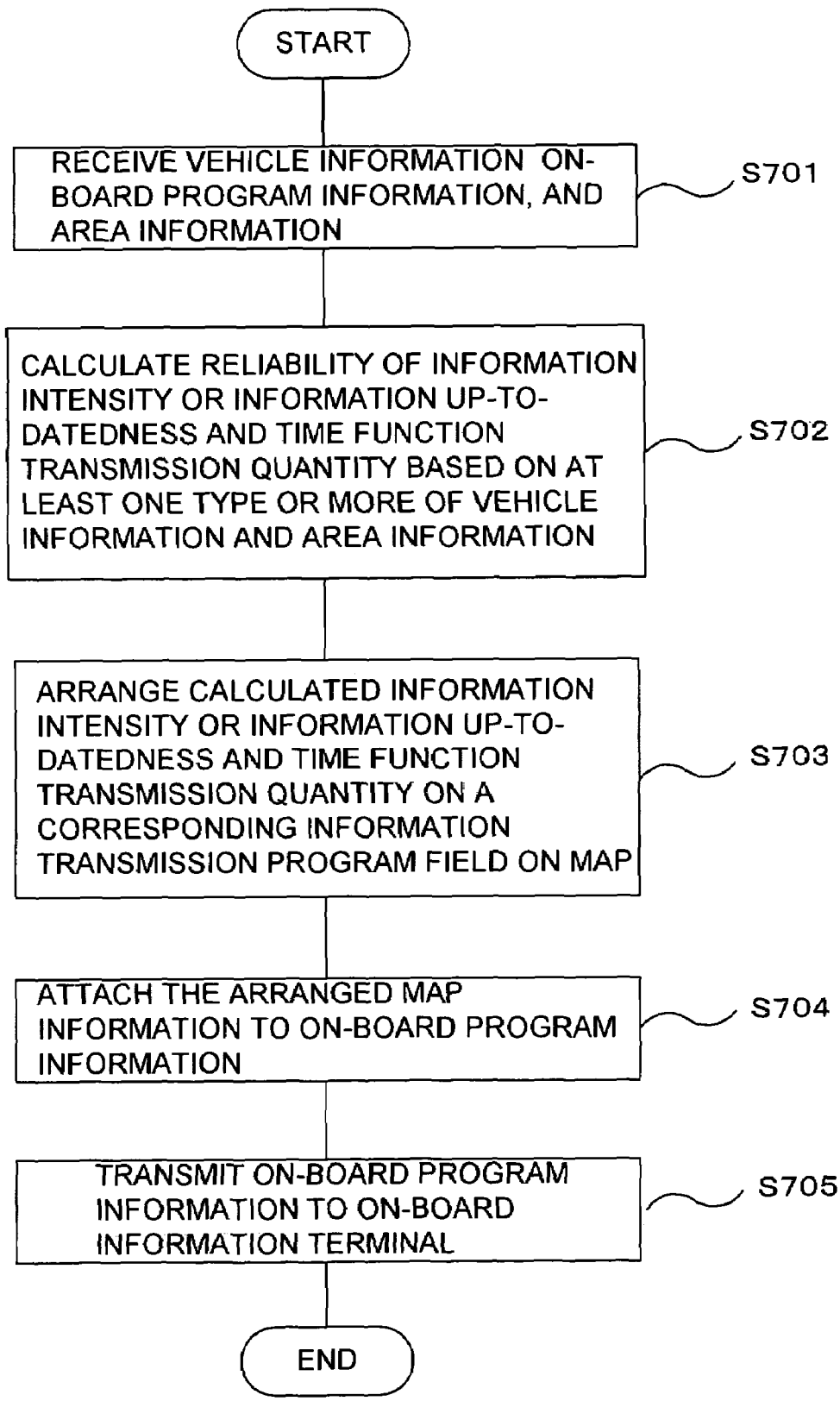
FIG. 7 is a flow chart to explain the processing from calculation of information intensity at the information-sharing server to the transmission of an on-board program information, where a map information with information intensity arranged on it is attached, to an on-board information terminal in the first embodiment of the present invention.

FIG. 1 is a schematical drawing to show an arrangement of an information-sharing system of a first embodiment of the present invention. FIG. 2 is a diagram to explain a concrete example in case the digitized information intensity in an information-sharing server is reflected on a map in the first embodiment of the present invention. FIG. 3A is a histogram to show information intensity in an information transmission program field and in its surrounding in an information-sharing server in the first embodiment of the present invention. FIG. 3B is a histogram to show information intensity in an information transmission program field and in its surrounding in the information-sharing server in the first embodiment of the present invention. FIG. 4 represents diagrams to explain information intensity, which is attenuated as time elapses, in the information-sharing server in the first embodiment of the present invention. FIG. 5 represents diagrams to explain information intensity to be transmitted to adjacent information transmission program field or to the information-sharing server as time elapses in the information-sharing server in the first embodiment of the present invention. FIG. 6 is a drawing to show an arrangement of an information-sharing server in the first embodiment of the present invention. FIG. 7 is a flow chart to explain the processing from calculation of information intensity at the information-sharing server to the transmission of an on-board program information, where a map information with information intensity arranged on it is attached, to an on-board information terminal in the first embodiment of the present invention.

Figure 8:
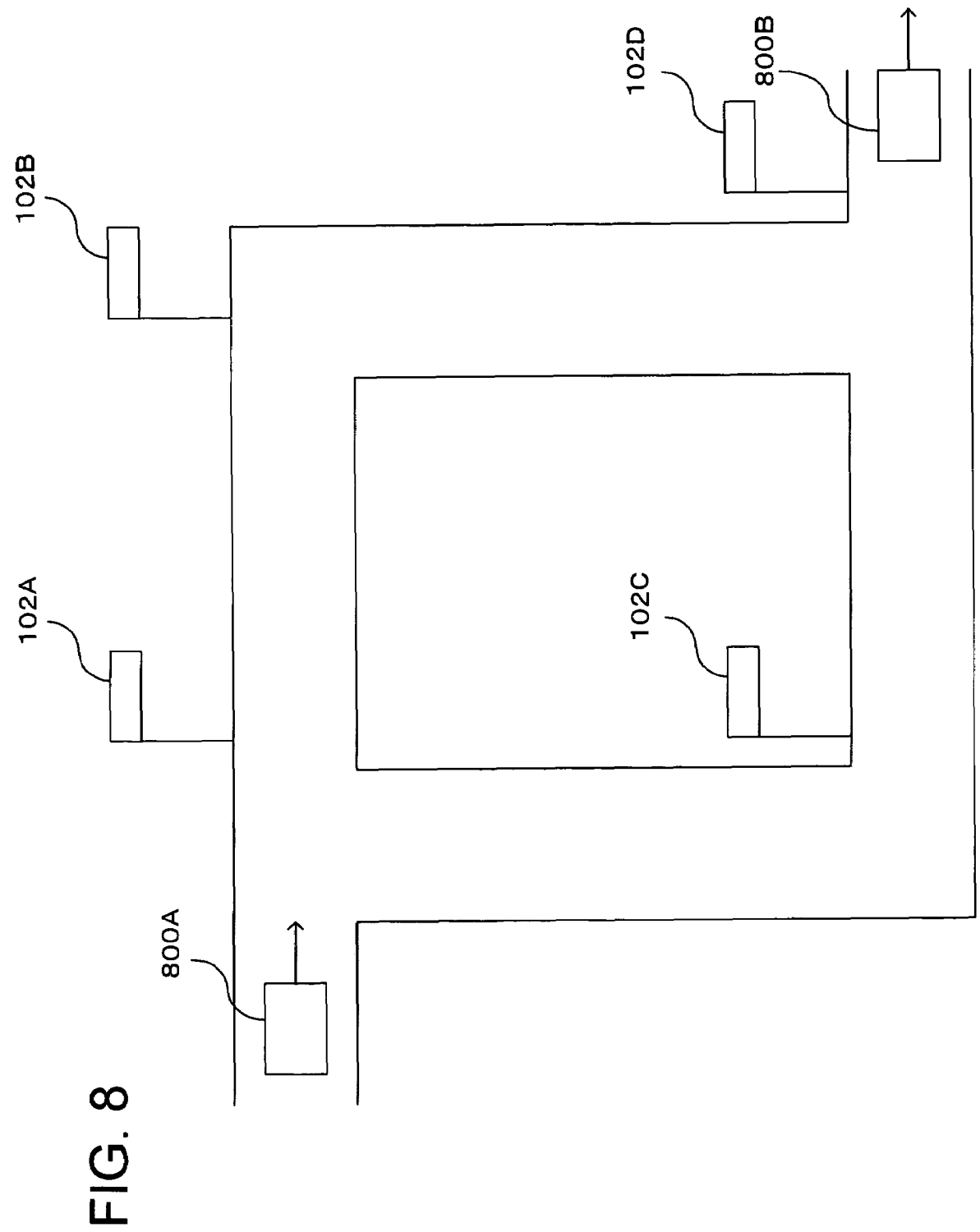
FIG. 8 is a drawing to explain route search by using the information-sharing system of the first embodiment of the present invention.
Figure 9:
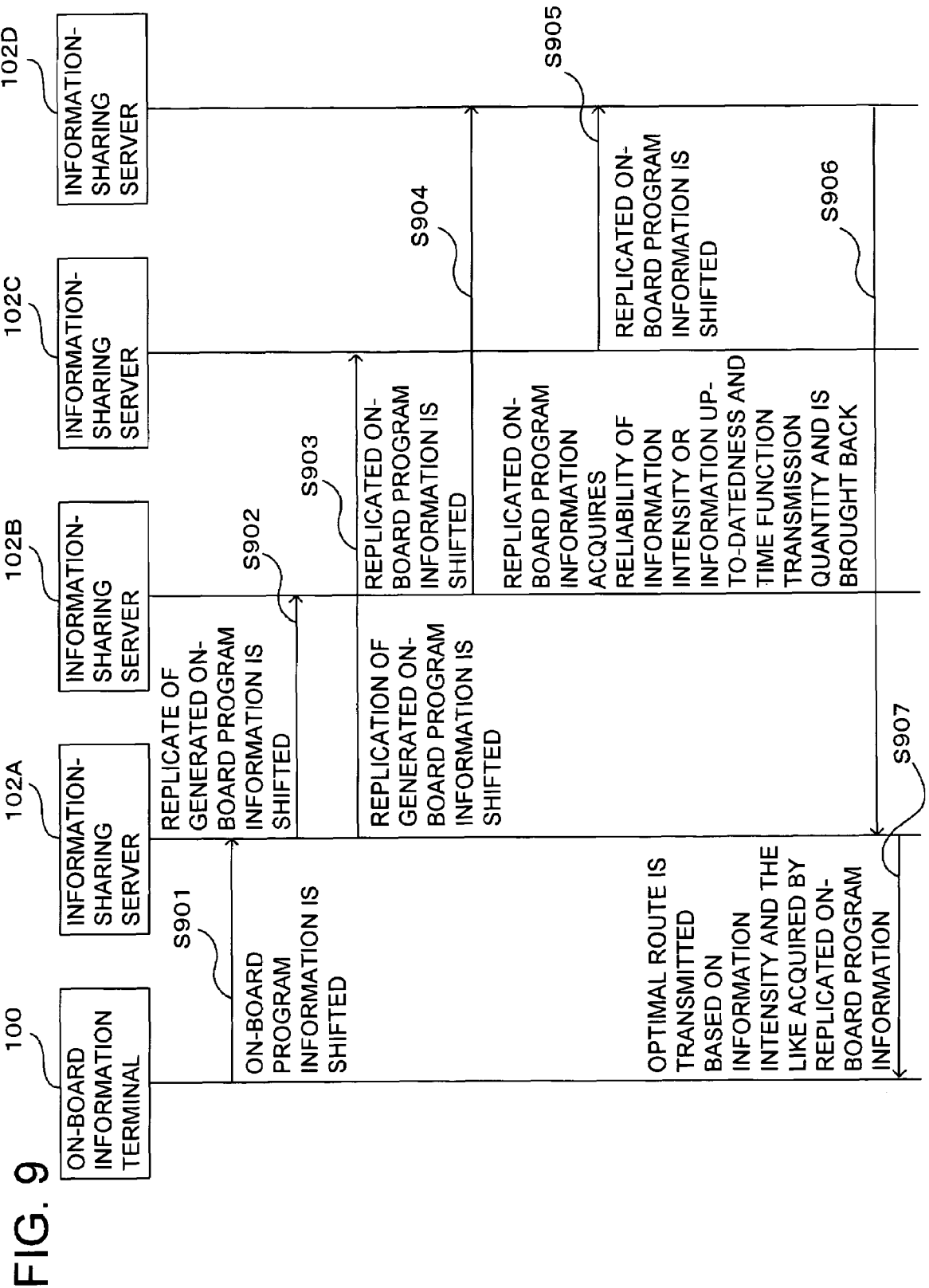
FIG. 9 is a drawing to explain route search by using the information-sharing system of the first embodiment of the present invention.
Figure 10:
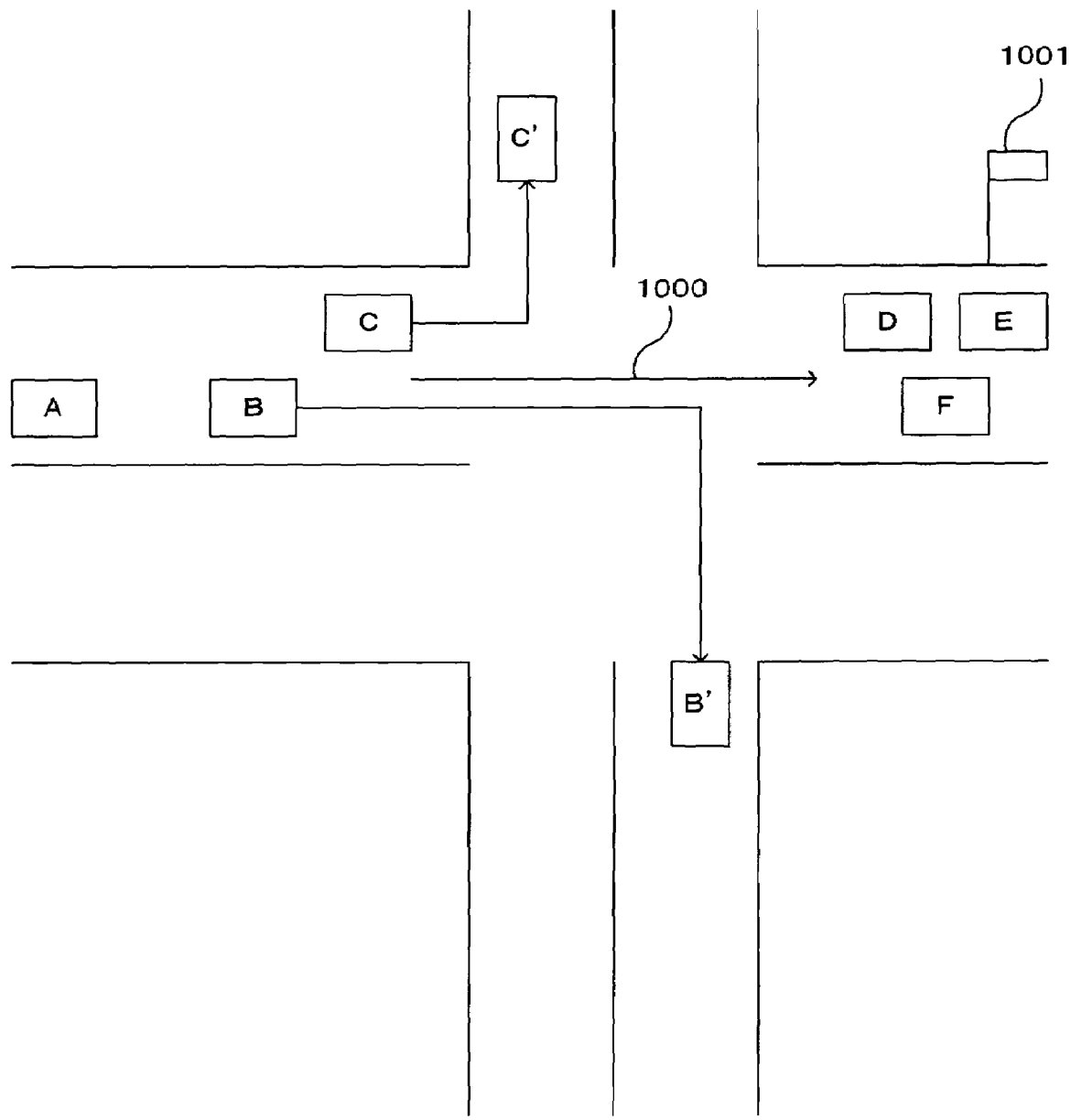
FIG. 10 is a drawing to explain an application to avoid traffic congestion by using the information-sharing system according to the first embodiment of the present invention.
Figure 11A:
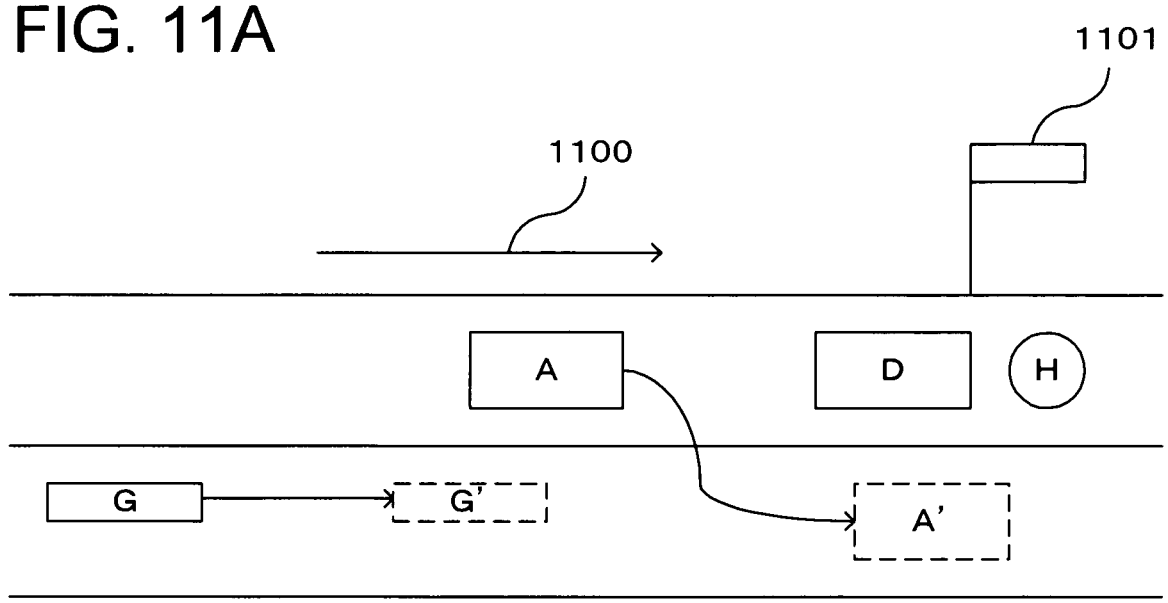
FIG. 11A is a drawing to explain an application to predict risk by using the information-sharing system according to the first embodiment of the present invention.
Figure 11B:
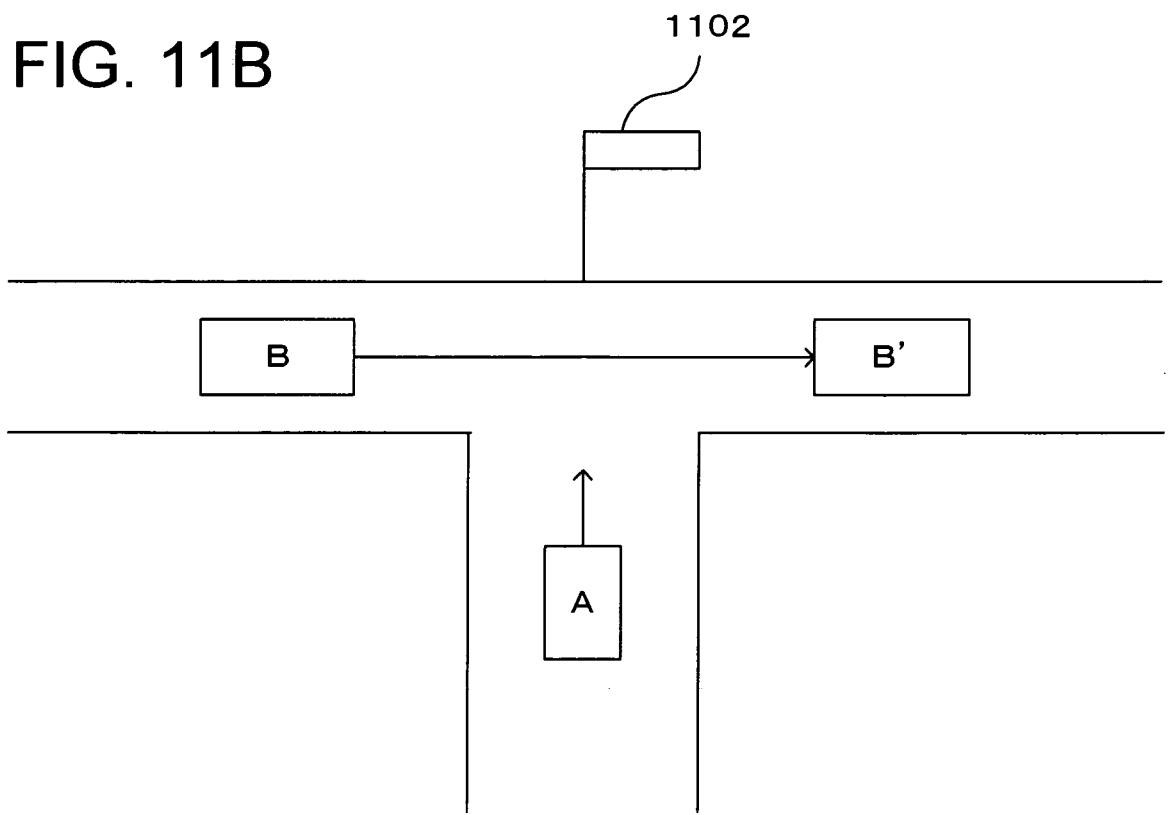
FIG. 11B is a drawing to explain an application to predict risk by using the information-sharing system according to the first embodiment of the present invention.
Figure 12:
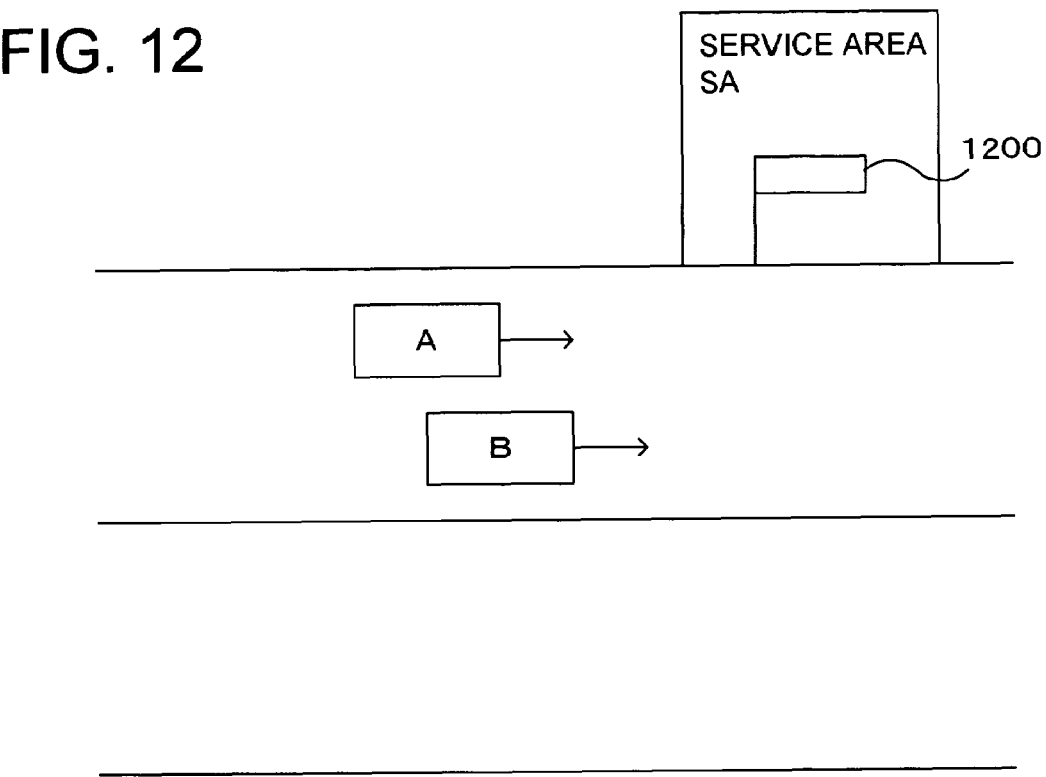
FIG. 12 is a drawing to explain an application to support service area utilization by using the information-sharing system according to the first embodiment of the present invention.

FIG. 8 is a drawing to explain route search by using the information-sharing system of the first embodiment of the present invention. FIG. 9 is a drawing to explain route search by using the information-sharing system of the first embodiment of the present invention. FIG. 10 is a drawing to explain an application to avoid traffic congestion by using the information-sharing system according to the first embodiment of the present invention. FIG. 11A is a drawing to explain an application to predict risk by using the information-sharing system according to the first embodiment of the present invention. FIG. 11B is a drawing to explain an application to predict risk by using the information-sharing system according to the first embodiment of the present invention. FIG. 12 is a drawing to explain an application to support service area utilization by using the information-sharing system according to the first embodiment of the present invention.

First, description will be given on an arrangement of the information-sharing system in the first embodiment of the present invention referring to FIG. 1. As shown in FIG. 1, the information-sharing system according to the first embodiment of the present invention comprises an on-board information terminal 100, an external sensor 101, and information-sharing servers 102 and 103. The on-board information terminal 100 transmits at least one or more types of information selected from vehicle information relating to own vehicle and from an on-board program information to acquire the shared information useful for driving of the vehicle, and it is provided on the vehicle. The vehicle information includes, e.g. an information on vehicle type and information on speed, information on the present position of the vehicle, and information on destination. The on-board information terminal 100 transmits the vehicle information to the information-sharing server 102 periodically or each time the vehicle advances into a predetermined area.

In this case, it may be designed in such manner that the information-sharing server 102 receiving the vehicle information invalidates the vehicle information transmitted from the on-board information terminal 100 provided on the vehicle except the case where the vehicle transmitting the vehicle information passes through the area where the vehicle has entered and re-enters the area. Also, the on-board information terminal 100 may be designed to transmit the vehicle information to the information-sharing server 102 via the external sensor 101. The on-board information terminal 100 is, for instance a car navigation system. The on-board information terminal 100 is not limited to a car navigation system, but it may be a portable information terminal such as a handy phone terminal, a PDA terminal, etc. In this case, the portable information terminal such as handy phone terminal, PDA terminal, etc. has the function of car navigation system. Also, the portable information terminal may be designed in such manner that it does not transmit the information on own vehicle just as car navigation system but it acquires only the information owned by the information-sharing server 102. Here, the term "vehicle" is applied to a four-wheel automobile, a two-wheel motorcycle, etc.

The external sensor 101 acquires an information such as information on driving route of the vehicle, traffic congestion on or around the driving route, quantity of exhaust gas and traffic condition of pedestrians and other persons. This corresponds to a system to acquire an area information as described above. The term "area information" is applied to an information on the number of vehicles on the route, quantity of exhaust gas of vehicles, number of pedestrians walking on sidewalk, and number of pedestrians standing on sidewalk. The external sensor 101 is, for instance, a camera installed at a fixed point or RFID (radio frequency identification) receiver. The external sensor 101 is installed so that it can accurately acquire the area information. For example, it may be installed along a road at every several meters or at each intersection. By taking the cost of installation into account, the external sensor may be installed only at places with more dense traffic condition or the places where traffic condition tends to vary.

Based on at least one or more types of information, i.e. vehicle information received from the on-board information terminal 100 and the area information received from the external sensor 101, the information-sharing server 102 acquires the number of vehicles or number of pedestrians and vehicles and quantity of exhaust gas and calculates time function existing quantity (also called "generation pheromone") based on time function including the acquired quantity. Then, it calculates time function transmission quantity to be transmitted to adjacent areas as time elapses based on time function including the time function existing quantity thus calculated. The time function existing quantity and the time function transmission quantity are placed at the corresponding positions on a finely divided map. Map information on a map where the time function existing quantity and the time function transmission quantity are placed is attached to the on-board program information received from the on-board information terminal 100, and this is transmitted to the on-board information terminal 100. Here, the term "adjacent area" is defined as an information transmission program field (to be described later) in the information-sharing server 102 or an information transmission program field managed by an adjacent information-sharing server 103. The information-sharing server is not limited to this.

Also, the time function is, for instance, a function of time "t". It is obtained as a value, which is "t" times as much as a constant reduction ratio and a transmission ratio multiplied by existing quantity of persons and vehicles and multiplied by time function existing quantity. The time function may be a preset value or may be set dynamically. Hereinafter, the time function existing quantity is also called as reliability of information intensity or information up-to-datedness (freshness). The information intensity is determined according to such a standard that it is 10 when there are 100 pedestrians, for instance. It is 10 when there are 5 vehicles or when there are 10 kg of exhaust gas. The reliability of information up-to-datedness is determined by such a standard that the reliability of information up-to-datedness is higher when information intensity is 10 than it is 5. The standard is not limited to this. The range of information intensity or information up-to-datedness may be from 0 to 10 or from 0 to 100, and it is not limited to this. The information intensity may not be digitized according to a preset rule but may be a quantity actually existing. Now, description will be given on a concrete example in case the digitized information intensity or information up-to-datedness is reflected on a map referring to FIG. 2.

As shown in FIG. 2, the map is divided to a first area 200 and a second area 201. On the map, a road 202 is shown. Hereinafter, these divided areas are called "information transmission fields". The map is not to be divided only to the information transmission fields 200 and 201, but it may be divided to a plurality of information transmission fields. An area where the information transmission field is further divided in form of lattice is called information transmission program field. In case an event is carried out at a place, which corresponds to the information transmission program field 203, the information transmission program field 203 where pedestrians are present in crowded state is expressed by a numerical value 10 of the reliability of the information intensity or information up-to-datedness. In this case, the information transmission program field in the surrounding may be expressed by a numerical value proportional to the number of persons based on the information intensity at the information transmission program field 203.

Now, description will be given on digitization of information intensity in case where an event is carried out at a place, which corresponds to the information transmission program field 204 and the adjacent information transmission program field, or at a place, which corresponds to the information transmission program field 205 and the adjacent information transmission program field, i.e. in case a plurality of events are carried out in the neighborhood. First, in case an event A is carried out at a place, which corresponds to the information transmission program field 204 and the adjacent information transmission program field, the information intensity is arranged on the information transmission program fields in 8 directions around the information transmission program field 204, i.e. in the upper row from left to right as 9, 8, and 6. Also, in the middle row from left to right as 9, 10, and 8, and further, in the lower row, from left to right as 9, 9, and 7.

On the other hand, in case an event B is carried out at a place, which corresponds to the information transmission program field 205 and the adjacent information transmission program field, the information intensity is arranged in the information transmission program fields in 8 directions around the information transmission program field 205, i.e. in the upper row from left to right as 6, 7, and 8. In the middle row from left to right as 7, 10, and 9, and further, in the lower row from left to right as 4, 6, and 7. In this example, it is assumed for convenience that there are only 9 information transmission program fields, but it is not limited to these.

FIG. 3A and FIG. 3B show: a histogram to represent the reliability of information intensity or information up-to-datedness at the information transmission program field 204 and in its surrounding, a histogram to represent information intensity or information up-to-datedness at the information transmission program field 205 and in its surrounding, and a histogram where the reliabilities of information intensity or information up-to-datedness shown in the above two histograms are summed up. The histograms shown in FIG. 3A and FIG. 3B represent the reliabilities of information intensity or information up-to-datedness in the middle row, from left to right, in case a plurality of events are carried out in the neighborhood as described in FIG. 2. In FIG. 3A, the reliabilities of information intensity or information up-to-datedness of the events A and B are represented with two different widths.

The histogram with wider width represents the event A, and the histogram with narrower width represents the event B. There are portions where these two histograms are overlapped on each other. In the overlapped portion, the reliabilities of information intensity or information up-to-datedness are turned to numerical values by summing up the values. FIG. 3B shows a case where the values in the two histograms are summed up. As shown in FIG. 3B, the values are summed up in the overlapped portion, and there may be an information transmission program field where the reliabilities of information intensity or information up-to-datedness initially arranged exceed the maximum value of 10.

In the map shown in FIG. 2, event information is reflected, while it may be a map where traffic congestion information showing congestion of vehicles is reflected. In this case, the maps when event information and traffic congestion information are reflected are managed separately.

For example, when the map is used for route search, if it is wanted to avoid traffic congestion, the map reflecting the traffic congestion information is used for the prediction of traffic congestion because of its reliability on information up-to-datedness. If the user wants to participate in an event, the map reflecting the event information is used. However, it is not limited only to the maps reflecting the event information and the traffic congestion information, but there may be maps, which reflect various types of information.

Also, the reliabilities of information intensity or information up-to-datedness are attenuated as time elapses. For example, the reliabilities are attenuated by 10% per second. The time of attenuation is not limited to the interval of one second, and it may be attenuated at any interval. The rate of attenuation is also not limited to 10% and it may be at any rate, while it is preferable to attenuate at the rate of 10% to 20%. Now, description will be given on the reliabilities of information intensity or information up-to-datedness to be attenuated as time elapses by referring to FIG. 4. As shown in FIG. 4, an information transmission program fields group 400 is turned to an information transmission program field group 401 when the time "t1" elapses. When the time "t2" elapses, it is turned to an information transmission program field group 402. In this way, the reliabilities of information intensity or information up-to-datedness are attenuated as time elapses. It may be designed in such manner that the reliability of information intensity or information up-to-datedness is turned to invalid when a preset time has elapsed.

The reliabilities of information intensity or information up-to-datedness also depend on a place where the external sensor 101 is installed. For example, in a crowded quarter such as Shibuya, Tokyo, where there are many persons, the reliability of information intensity or information up-to-datedness is set to 5 if there are 100 persons, and it is set to 10 if there are 100 persons at a place such as near park where there are usually not many persons. This is because, at a place where there are usually not many persons, the number of persons does not change and is hardly to be attenuated. As a result, the reliability of information intensity or information up-to-datedness is set to a higher value than the place where there are usually many persons. The reliability of information intensity or information up-to-datedness is transmitted to the adjacent information transmission program field as the time elapses. For example, it is transmitted by 10% per second. The time when the information is transmitted is not limited to an interval of one second, and the information may be transmitted at any interval. Also, the rate to be transmitted is not limited to 10% and may be at any percentage.

In case the reliability of the information intensity or information up-to-datedness already existing in the adjacent information transmission program field exceeds a preset value, the transmission rate is lower. If it does not exceed the preset value, the transmission rate is higher. For example, it may be designed in such manner that in case the reliability of information intensity or information up-to-datedness in the adjacent information transmission program field exceeds 5, the information is transmitted by 10% per second, and if it does not exceed 5, it may be transmitted at 20% per second. Now, description will be given on the reliability of information intensity or information up-to-datedness to be transmitted as the time elapses referring to FIG. 5. As shown in FIG. 5, when the time "t3" elapses, the information transmission program field group 500 is turned to an information transmission program field group 501. Further, when the time "t4" elapses, it is turned to an information transmission program field group 502. Thus, the reliability of information intensity or information up-to-datedness is transmitted as time elapses. It may be set in such manner that the reliability of information intensity or information up-to-datedness is turned to invalid when a preset time has elapsed.

Next, description will be given on an arrangement of the information-sharing server 102 referring to FIG. 6. As shown in FIG. 6, the information-sharing server 102 of the present invention comprises a receiving unit 600, a calculating unit 601, an arrangement unit 602, an attachment unit 603, and a transmitting unit 604. The receiving unit 600, serving as receiving means, receives at least one or more types of information among the on-board program information to acquire vehicle information relating to user's own vehicle and a shared information useful for the driving of the vehicle from the on-board information terminal 100, and it also receives an area information, i.e. information on the driving route of the vehicle, traffic congestion on or around the driving route, quantity of exhaust gas and traffic quantity such as the number of pedestrians and other persons from the external sensor 101. The calculating unit 601, serving as calculating means, calculates the reliability of information intensity or information up-to-datedness based on at least one or more types of information among the vehicle information and the area information received by the receiving unit 600. Then, time function transmission quantity to be transmitted to an adjacent area as time elapses based on the time function including the reliability of information intensity or information up-to-datedness is calculated.

The arrangement unit 602, serving as arrangement means, arranges the reliability of information intensity or information up-to-datedness calculated by the calculating unit 601 and the time function transmission quantity to the corresponding information transmission program field on the finely divided map. The information on the map is stored in a storage area (not shown). By the attachment unit 603, serving as attachment means, map information of the map, where the reliability of information intensity or information up-to-datedness and the time function transmission quantity are arranged by the arrangement unit 602, is attached to the on-board program information when the on-board program information is received by the receiving unit 600. In this case, the on-board program information may be an agent, which is independently operated. The transmitting unit 604, serving as transmitting means, transmits the on-board program information to the on-board information terminal 100. The on-board program information is an information, to which the information of the map is attached by the attachment unit 603, i.e. the map where the reliability of information intensity or information up-to-datedness and the time function transmission quantity are arranged.

Next, referring to FIG. 7, description will be given on the processing, i.e. the processing from the calculation of the reliability of information intensity or information up-to-datedness and the time function transmission quantity in the information-sharing server 102 to the transmission of the on-board program information to the on-board information terminal 100. The on-board program information is an information, to which the information of the map is attached, i.e. the map where the reliability of information intensity or information up-to-datedness and the time function transmission quantity are arranged. The receiving unit 600 receives at least one or more types of information among the vehicle information and the on-board program information from the on-board information terminal 100 and also receives the area information from the external sensor 101 (Step S701). Based on at least one or more types of information among the vehicle information and the area information received by the receiving unit 600, the calculating unit 601 calculates the reliability of information intensity or information up-to-datedness and the time function transmission quantity (Step S702). The arrangement unit 602 arranges the reliability of information intensity or information up-to-datedness calculated by the calculating unit 601 to the corresponding information transmission program field on the map (Step S703). When the on-board program information is received by the receiving unit 600, the attachment unit 603 attaches the information of the map to the on-board program information (Step S704), i.e. the map where the reliability of information intensity or information up-to-datedness and the time function transmission quantity are arranged by the arrangement unit 602. The transmitting unit 604 transmits the on-board program information with the map information attached on it to the on-board information terminal 100 (Step S705), i.e. the map where the reliability of information intensity or information up-to-datedness and the time function transmission quantity are arranged by the attachment unit 603.

Next, description will be given on route search by using the information-sharing system of the first embodiment as described above by referring to FIG. 8 and FIG. 9. As shown in FIG. 8, when a vehicle 800A searches a route to a destination where a vehicle 800B is present, the vehicle 800A selects a route via a road where an information-sharing server 102B is installed or via a road where an information-sharing server 102C is installed. Let us assume a case where the vehicle 800A wants to avoid traffic congestion and wants to hurriedly go to the destination. As shown in FIG. 9, the on-board information terminal 100 of the vehicle 800A shifts the on-board program information to the information-sharing server 102A (Step S901). The on-board program information in this case is to acquire the reliability of information intensity or information up-to-datedness and the time function transmission quantity owned by the information-sharing server. The vehicle information of the vehicle 800A may be shifted together with the on-board program information. This vehicle information is offered to each of the information-sharing servers when it is shifted together with the on-board program information. The information-sharing server 102A replicates the on-board program information, and the replication of the on-board program information is shifted to the information-sharing servers 102B and 102C (Steps S902 and S903).

By the information-sharing server 102B, the on-board program information, replicated and shifted from the information-sharing server 102A, acquires the reliability of information intensity or information up-to-datedness and the time function transmission quantity, and it is shifted to the information-sharing server 102D (Step S904). By the information-sharing server 102C, the replicated on-board program information shifted from the information-sharing server 102A acquires the reliability of information intensity or information up-to-datedness, and the time function transmission quantity, and it is moved toward the information-sharing server 102D (Step S905). By the information-sharing server 102D, the replicated on-board program information shifted from the information-sharing servers 102B and 102C acquires the reliability of information intensity or information up-to-datedness and the time function transmission quantity, and it is moved back to the information-sharing server 102A (Step S906). Based on the reliability of information intensity or information up-to-datedness and the time function transmission quantity acquired by the replicated on-board program information, the information-sharing server 102A determines the optimal route, and the optimal route thus determined is transmitted to the on-board information terminal 100 (Step S907).

Next, referring to FIG. 10, description will be given on an application to avoid traffic congestion by using the information-sharing system according to the first embodiment as described above. All of vehicles A, B, C, D, E and F are driven in a direction shown by an arrow 1000, and the vehicles C, D and F are driven toward the same destination. Traffic congestion exists at a place where the vehicles D, E and F are present. In this case, the information-sharing server 1001 calculates the reliability of information intensity or information up-to-datedness and the time function transmission quantity from traffic congestion near the place where the vehicles D, E and F are present, and the reliability of information intensity or information up-to-datedness and the time function transmission quantity thus calculated are placed at the corresponding information transmission program field on a map. The vehicles A, B and C coming from the rear acquire the map information thus arranged, and these vehicles make detour in the directions toward their respective destinations based on the map information thus acquired.

In the case shown in FIG. 10, the vehicle C turns to the left toward a position C'. The vehicle B turns to the right toward a position B', thus avoiding traffic congestion. If it is not chronic (longstanding) congestion, the values of the reliability of information intensity or information up-to-datedness and the time function transmission quantity are decreased because the reliability of information intensity or information up-to-datedness and the time function transmission quantity are attenuated or cleared (eliminated) as time elapses. As a result, the vehicles may be driven straightforward. In case there is a vehicle, which is driven in risky way (not shown), e.g. in case there is a vehicle, which incites the vehicle ahead by entering the surpassing lane and by lifting the right winker, the information-sharing server 1001 turns the presence of such vehicle to a numerical value to express the reliability of information intensity or information up-to-datedness and the time function transmission quantity. By the information-sharing server 1001, the vehicle coming from the rear acquires the reliability of information intensity or information up-to-datedness and the time function transmission quantity, and this arouses the attention of the driver of the vehicle coming from the rear.

Next, referring to FIG. 11, description will be given on an application to predict risk by using the information-sharing system according to the first embodiment as described above. As shown in FIG. 11A, a vehicle A and a motorcycle G are driven in the direction of an arrow 1100. A vehicle D is parked in the driving lane of the vehicle A, and a person H is present ahead of the vehicle D. In this case, an information-sharing server 1101 turns the presence of a person H ahead of the parked vehicle D to a numerical value expressed as information intensity. Then, by the information-sharing server 1101, the vehicle A being driven acquires a map information where the information intensity expressed as the numerical value is arranged. Thus, the vehicle A can anticipate the risk and can change the driving lane completely to a position A'. Also, as shown in FIG. 11B, at a T-shaped crossroad, an information-sharing server 1102 turns the presence of a vehicle B, which is in dead angle from the vehicle A, to a numerical value, which expresses the reliability of information intensity or information up-to-datedness and the time function transmission quantity. By acquiring this value, the vehicle A can anticipate the risk and can be driven safely.

Next, referring to FIG. 12, description will be given on an application to support the utilization of service area by using the information-sharing system according to the first embodiment as described above. As shown in FIG. 12, vehicles A and B are driven on a road, and a service area SA is installed along the driving road. An information-sharing server 1200, installed in the service area SA, turns the crowdedness in the service area SA as information intensity. By the information-sharing server 1200, the vehicles A and B, being driven along the road, acquire the numerical value of the reliability of information intensity or information up-to-datedness and the time function transmission quantity. As a result, the vehicles A and B can select whether it would be better to stop at the service area SA or to pass to the next service area SA.

2nd Embodiment

Figure 13:
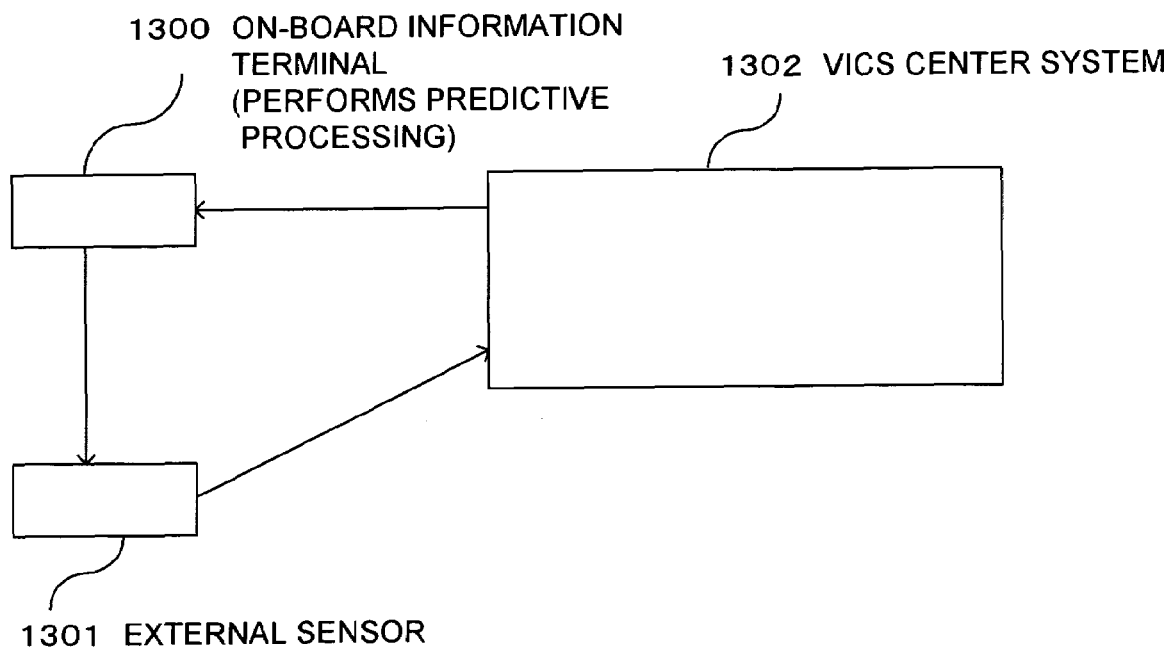
FIG. 13 is a drawing of an information-sharing system according to a second embodiment of the present invention.

Next, referring to FIG. 13, description will be given on an arrangement of an information-sharing system according to a second embodiment of the present invention. As shown in FIG. 13, the information-sharing system according to the second embodiment of the present invention comprises an on-board information terminal 1300, an external sensor 1301, and a VICS center system 1302. A relay system or the like (not shown) may be provided between the on-board information terminal 1300 and the VICS center system 1302 and between the external sensor 1301 and the VICS center system 1302. In the description given below, it is described that the processing is performed by the on-board information terminal 1300, the external sensor 1301, and the VICS center system 1302. Actually, however, the processing is carried out by processing means in each of these systems. The on-board information terminal 1300 transmits vehicle information relating to user's own vehicle to the external sensor 1301, and it is provided on a vehicle. Vehicle information is defined as an information on type and speed of the vehicle, information on the present position of the vehicle, and information on destination. The vehicle information is transmitted to the external sensor 1301 by the on-board information terminal 1300 periodically or each time the vehicle is advanced to a preset area.

Here, the external sensor 1301 may be designed in such manner that, upon receipt of the vehicle information, the vehicle information transmitted from the on-board information terminal 1300 provided on the vehicle is turned to invalid except the case where the vehicle passes through an area, for which the vehicle information has been transmitted, and the vehicle re-enters the area. The on-board information terminal 1300 is a car navigation system, for instance. However, the on-board information terminal 1300 is not limited to the car navigation system and may be a portable information terminal such as handy phone terminal, PDA terminal, etc. In this case, the handy phone terminal, PDA terminal, etc. have the functions of a car navigation system. Also, the portable information terminal may be designed in such manner that, unlike the car navigation system, it does not transmit the information on user's own vehicle but simply acquires only the information of the VICS center system 1302. Here, the vehicle is defined as a four-wheel automobile, two-wheel motorcycle, etc.

The external sensor 1301 acquires an area information, i.e. traffic quantity on the driving road of the vehicle and in the surrounding of the driving road, quantity of exhaust gas, and traffic quantity of pedestrians and other persons. And this corresponds to an area information acquiring system as described above. Here, the "area information" means number of vehicles driven along the road, quantity of exhaust gas, number of pedestrians walking on sidewalks, and number of persons standing on sidewalks, etc. The external sensor 1301 is, for example, a fixed camera, RFID receiver, etc. The external sensor 1301 is installed to accurately acquire the area information. For example, external sensor may be installed at every several meters along the road or at every crossroad. Taking the installation cost into account, external sensors may be installed only at such places where there are relatively high traffic quantity or variable traffic quantity as learned from the experience.

The VICS center system 1302 sums up the area information received from the external sensor 1301 and transmits the information thus summed up to the on-board information terminal 1300. Based on the information received from the VICS center system 1302, the on-board information terminal 1300 acquires the number of vehicles, number of persons, vehicles and exhaust gas quantity. The time function existing quantity (also called "generation pheromone") based on time function including the acquired existing quantity is calculated. Then, time function transmission quantity (also called "transmission pheromone") transmitted from adjacent area as time elapses based on the preset time function is calculated. The on-board information terminal 1300 arranges the time function existing quantity, the time function transmission quantity thus calculated and time function remaining quantity (also called "remaining pheromone") arranged previously and currently remaining to a corresponding position on a finely divided map. Here, the preset time function means q(t,p) as to be described later. Also, the adjacent area means adjacent information transmission program field as already described in the first embodiment.

Time function is a function of the time "t", for instance. Here, the time function may be a preset value or it may be dynamically set. The pheromone is supposed to be 10 when there are 100 persons, for instance. It is 10 in case there are 5 vehicles, and it is 10 when exhaust gas quantity is 10 kg. The range of pheromone may be from 0 to 10 or from 0 to 100, and it is not limited to this. Because the pheromone expressed in numerical value is the same as in the first embodiment, detailed description is not given here. The formulae to calculate intensity of pheromone at the next time point (t+1) and (intensity of) time function transmission quantity at the next time point (t+1) are shown in the equations (1) and (2) below:

Equation 1 (1)
$$s(t+1, p) = E \times s(t, p) + r(t, p) + q(t, p)$$

Equation 2 (2)
$$q(t+1, p) = \sum_{p \in N(p')} \frac{F}{N(p')} (r(t \cdot p') + q(t, p'))$$

The symbol E in the equation (1) represents evaporation ratio (0<E<1), and the symbol r (t, p) represents intensity of pheromone generated at a place (position) p at the preceding time point. The evaporation ratio E is calculated from diffusion ratio F (to be described later), number of lanes, and average traffic quantity. The symbol F in the equation (2) represents diffusion ratio (0<F<1), and N (p') denotes the number of places adjacent to p. Here, r (t, p) and diffusion ratio F are given by the equations (3) and (4):

Equation 3 (3)
$$r(t, p) = \frac{\alpha}{v(t, p)}$$

Equation 4 (4)
$$F = f(p, p') = \begin{cases} \beta & p \text{ and } p' \text{ on a straight line} \\ \frac{\beta}{s(t, p)} & (s(t, p) > c) \\ \gamma & p \text{ and } p' \text{ not on a straight line} \\ \frac{\gamma}{s(t, p)} & (s(t, p) > c) \end{cases}$$

The symbol α in the equation (3) represents generation parameter (generation ratio), and the symbol v represents the speed of the vehicle. The generation parameter is calculated from type of vehicle, number of lanes, average traffic quantity, etc. The symbols β and γ in the equation (4) represent diffusion parameters (diffusion ratios). The symbol c represents a threshold corresponding to traffic congestion. The models of the equations (1) and (2) are the models proposed by Sven Brueckner, and these are described in: http://dochost.rz.hu-berlin.de/dissertaionen/brueckner-sven-2000-06-21/PDF/Brueckner.pdf (P.43). In the present embodiment, it is based on the extension of the models of Sven Brueckner, and the extended portions correspond to the equations (3) and (4).

The on-board information terminal 1300 predicts traffic quantity at the next time point from the quantity of pheromone (the result of predictive processing) calculated from the above models, and a route is searched to avoid traffic congestion.

3rd Embodiment

Figure 14:
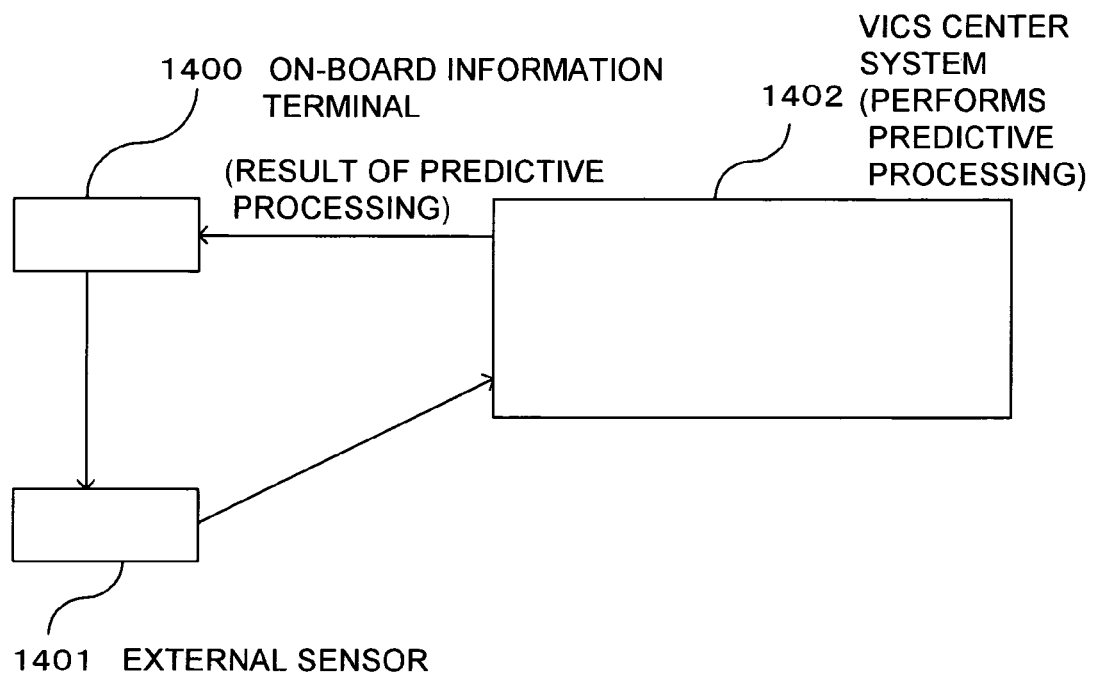
FIG. 14 is a drawing of an information-sharing system according to a third embodiment of the present invention.

Next, referring to FIG. 14, description will be given on an arrangement of the information-sharing system according to a third embodiment of the present invention. As shown in FIG. 14, the information-sharing system according to the third embodiment of the invention comprises an on-board information terminal 1400, an external sensor 1401, and a VICS center system 1402. It may be designed in such manner that a relay system or the like (not shown) is present between the on-board information terminal 1400 and the VICS center system 1402 and between the external sensor 1401 and the VICS center system 1402. In the description given below, it is described that processing is performed by the on-board information terminal 1400, the external sensor 1401, and the VICS center system 1402, while processing is actually carried out by the processing means in each of these systems. The on-board information terminal 1400 transmits vehicle information relating to user's own vehicle to the external sensor 1401 and it is installed on board vehicle information means information on type and speed of the vehicle, information on the present position of the vehicle, and information on destination.

The on-board information terminal 1400 transmits the vehicle information to the external sensor 1401 periodically or each time the vehicle is advanced to a preset area. Here, the external sensor 1401 may be designed in such manner that, upon receipt of the vehicle information, the vehicle information transmitted from the on-board information terminal 1400 provided on the vehicle is turned to invalid except the case where the vehicle passes through an area, for which the vehicle information has been transmitted, and the vehicle re-enters the area. The on-board information terminal 1400 is a car navigation system, for instance. However, the on-board information terminal 1400 is not limited to the car navigation system and may be a portable information terminal such as handy phone terminal, PDA terminal, etc. In this case, the handy phone terminal, PDA terminal, etc. have the functions of a car navigation system. Also, the portable information terminal may be designed in such manner that, unlike the car navigation system, it does not transmit the information on user's own vehicle but simply acquires only the information of the VICS center system 1402. Here, the vehicle is defined as a four-wheel automobile, two-wheel motorcycle, etc.

The external sensor 1401 acquires an area information, i.e. traffic quantity on the driving road of the vehicle and in the surrounding of the driving road, quantity of exhaust gas, and traffic quantity of pedestrians and other persons. And this corresponds to an area information acquiring system as described above. Here, the "area information" means number of vehicles driven along the road, quantity of exhaust gas, number of pedestrians walking on sidewalks, and number of persons standing on sidewalks, etc. The external sensor 1401 is, for example, a fixed camera, RFID receiver, etc. The external sensor 1401 is installed to accurately acquire the area information. For example, external sensor may be installed at every several meters along the road or at every crossroad. Taking the installation cost into account, external sensors may be installed only at such places where there are relatively high traffic quantity or variable traffic quantity as learned from the experience.

Based on at least one or more types of the vehicle information and the area information received from the external sensor 1401, the VICS center system 1402 acquires the number of vehicles, number of persons, vehicles and exhaust gas quantity. The time function existing quantity (also called "generation pheromone") based on time function including the acquired existing quantity is calculated. Then, time function transmission quantity (also called "transmission pheromone") transmitted from adjacent area as time elapses based on the preset time function is calculated. The VICS center system 1402 arranges the time function existing quantity, the time function transmission quantity thus calculated and time function remaining quantity (also called "remaining pheromone") arranged previously and currently remaining to a corresponding position on a finely divided map. Map information of the map where these data are arranged is transmitted to the on-board information terminal 1400. Here, the preset time function is defined as q(t,p) as already described in the second embodiment. Also, the adjacent area means adjacent information transmission program field as already described in the first embodiment.

Time function is a function of the time "t", for instance. Here, the time function may be a preset value or it may be dynamically set. The pheromone is supposed to be 10 when there are 100 persons, for instance. It is 10 in case there are 5 vehicles, and it is 10 when exhaust gas quantity is 10 kg. The range of pheromone may be from 0 to 10 or from 0 to 100, and it is not limited to this. Because the pheromone expressed in numerical value is the same as in the first embodiment, detailed description is not given here. The formulae to calculate the intensity of pheromone at the next time point and (intensity of) the time function transmission quantity at the next time point are the same as in the second embodiment, and detailed description is not given here.

The on-board information terminal 1400 predicts the traffic quantity at the next time point from the quantity of pheromone (the result of predictive processing) received from the VICS center system 1402 and searches a route to avoid traffic congestion.

4th Embodiment

Figure 15:
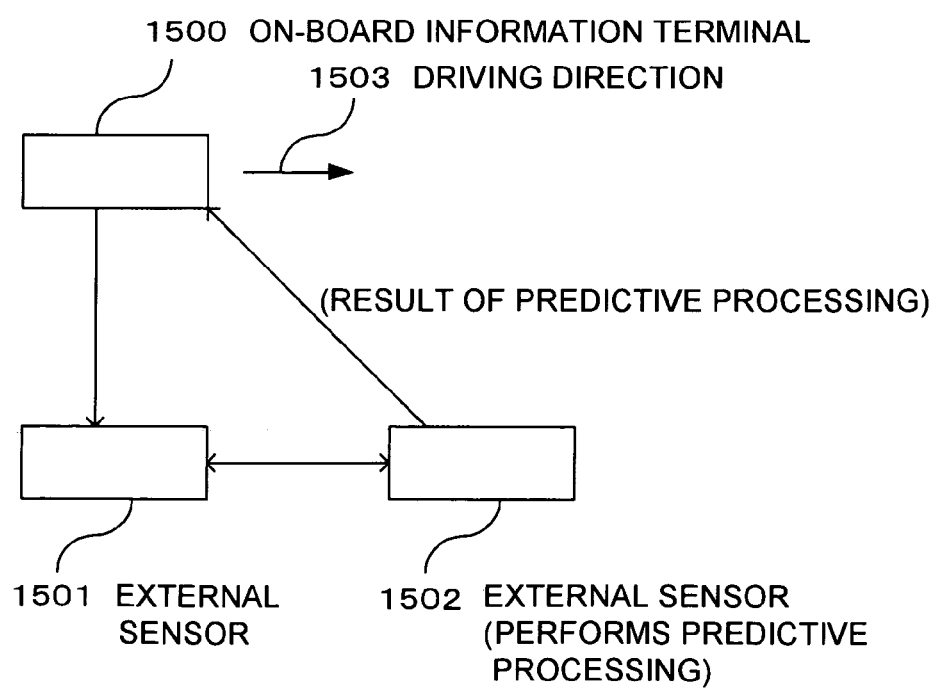
FIG. 15 is a drawing of an information-sharing system according to a fourth embodiment of the present invention.

Next, referring to FIG. 15, description will be given on an arrangement of the information-sharing system according to a fourth embodiment of the present invention. As shown in FIG. 15, the information-sharing system according to the fourth embodiment of the present invention comprises an on-board information terminal 1500, and external sensors 1501 and 1502. The external sensors are not limited to these two, but it is described here on a case where there are two external sensors. In the description given below, it is described that processing is performed by the on-board information terminal 1500, the external sensors 1501 and 1502, while processing is actually carried out by the processing means in each of these systems. The on-board information terminal 1500 transmits vehicle information on user's own vehicle to the external sensor 1501 in the neighborhood, for instance, and it is installed on the vehicle. The vehicle information means information on type and speed of the vehicle, information on the present position of the vehicle, and information on destination.

The on-board information terminal 1500 transmits the vehicle information to the external sensor 1501 periodically or each time the vehicle is advanced to a preset area. Here, the external sensor 1501 may be designed in such manner that, upon receipt of the vehicle information, the vehicle information transmitted from the on-board information terminal 1500 provided on the vehicle is turned to invalid except the case where the vehicle passes through an area, for which the vehicle information has been transmitted, and the vehicle re-enters the area. The on-board information terminal 1500 is a car navigation system, for instance. However, the on-board information terminal 1500 is not limited to the car navigation system and may be a portable information terminal such as handy phone terminal, PDA terminal, etc. In this case, the handy phone terminal, PDA terminal, etc. have the functions of a car navigation system. Also, the portable information terminal may be designed in such manner that, unlike the car navigation system, it does not transmit the information on user's own vehicle but simply acquires only the information of the external sensor 1501 or 1502. Here, the vehicle is defined as a four-wheel automobile, two-wheel motorcycle, etc.

The external sensors 1501 and 1502 are the external sensors adjacent to each other, and these sensors share the area information, i.e. the information on the driving road of the vehicle, information on the traffic quantity on and around the driving road, quantity of exhaust gas and information on the number of pedestrians and other persons. For example, when a vehicle with the on-board information terminal 1500 is driven in a driving direction 1503 in FIG. 15, based on the area information shared with the external sensor 1501 in advance, the external sensor 1502 acquires the number of vehicles, number of persons, vehicles and exhaust gas quantity. The time function existing quantity (also called "generation pheromone") based on time function including the acquired existing quantity is calculated. Then, time function transmission quantity (also called "transmission pheromone") transmitted from adjacent area as time elapses based on the preset time function is calculated. The external sensor 1502 arranges the time function existing quantity, the time function transmission quantity thus calculated and time function remaining quantity (also called "remaining pheromone") arranged previously and currently remaining to a corresponding position on a finely divided map. Then, the map information of a map where these data are arranged is transmitted to the on-board information terminal 1500.

Here, the preset time function means q(t,p) as to be described in the second embodiment. Also, the adjacent area means adjacent information transmission program field as already described in the first embodiment. Time function is a function of the time "t", for instance. Here, the time function may be a preset value or it may be dynamically set. The pheromone is supposed to be 10 when there are 100 persons, for instance. It is 10 in case there are 5 vehicles, and it is 10 when exhaust gas quantity is 10 kg. The range of pheromone may be from 0 to 10 or from 0 to 100, and it is not limited to this. Because the pheromone expressed in numerical value is the same as in the first embodiment, detailed description is not given here. The formulae to calculate the intensity of pheromone at the next time point and (intensity of) time function transmission quantity at the next time point are the same as in the second embodiment, and detailed description is not given here.

The on-board information terminal 1500 predicts traffic quantity at the next time point from the quantity of pheromone (the result of predictive processing) received from the external sensor 1502 and searches a route to avoid traffic congestion. The predictive processing is not necessarily carried out by the external sensor 1502 but it can be carried out by the other external sensor.

5th Embodiment

Figure 16:
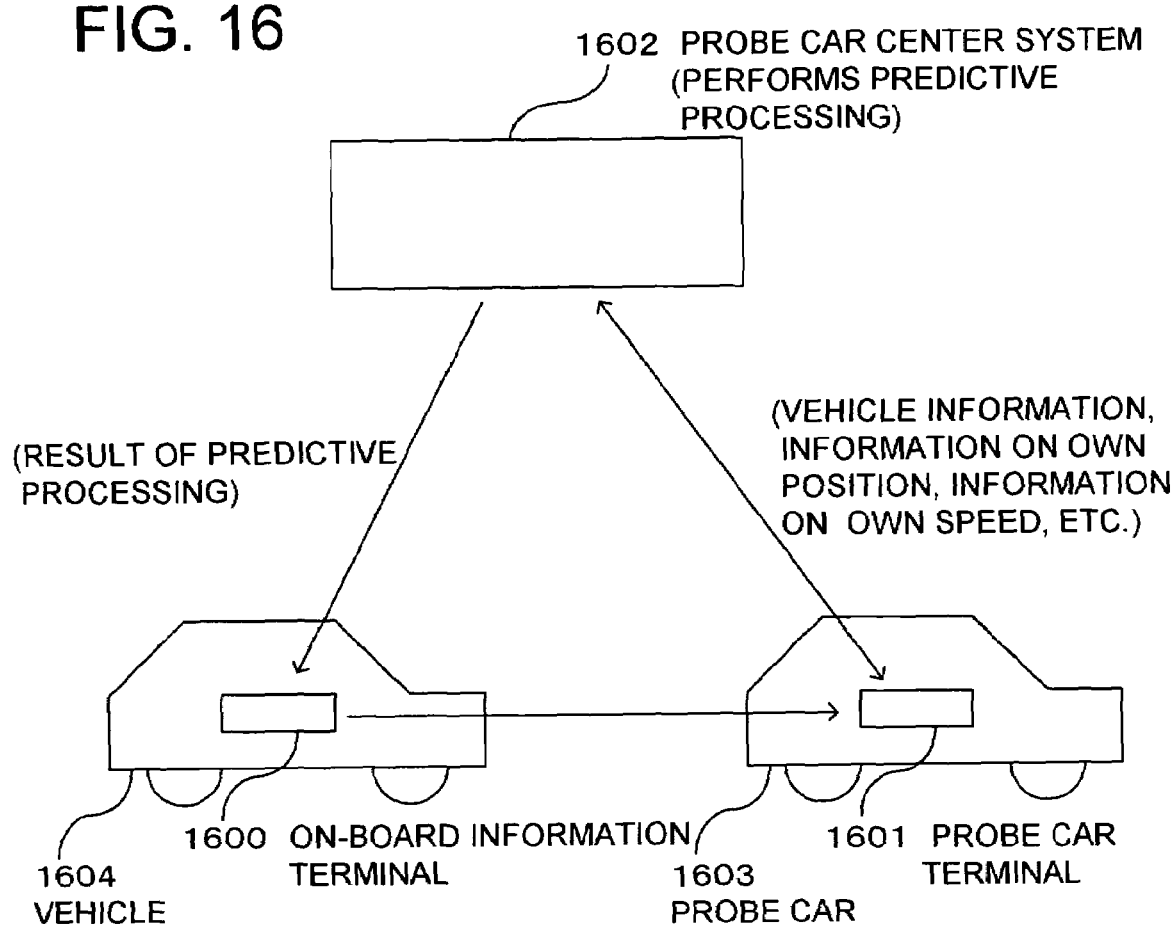
FIG. 16 is a drawing of an information-sharing system according to a fifth embodiment of the present invention.

Next, referring to FIG. 16, description will be given on an arrangement of an information-sharing system according to a fifth embodiment of the present invention. As shown in FIG. 16, the information-sharing system according to the fifth embodiment of the present invention comprises an on-board information terminal 1600, a probe car terminal 1601, and a probe car center system 1602. Between the on-board information terminal 1600 and the probe car center system 1602 and between the probe car terminal 1601 and the probe car center system 1602, information is given and taken via wireless public line, for instance. In the description given below, it is described that the on-board information terminal 1600, the probe car terminal 1601 and the probe car center system 1602 perform processing, while processing is actually carried out by processing means in each of these systems.

The probe car terminal 1601 is provided on a probe car 1603 actually driven. When the probe car 1603 is driven, traffic conditions in the surrounding is acquired. For example, the probe car terminal 1601 receives vehicle information of a vehicle from the on-board information terminal 1600 provided on a vehicle 1604, which is driven in the surrounding. The probe car terminal 1601 transmits the received vehicle information, i.e. information on its own position, information on its speed, etc. to the probe car center system 1602 via wireless public line. Based on the information received from the probe car terminal 1601, the probe car center system 1602 acquires the number of vehicles, number of persons and vehicles, and exhaust gas quantity. The time function existing quantity (also called "generation pheromone") based on time function including the acquired existing quantity is calculated. Then, time function transmission quantity (also called "transmission pheromone") transmitted from adjacent area as time elapses based on the preset time function is calculated. The probe car center system 1602 arranges the time function existing quantity, the time function transmission quantity thus calculated and time function remaining quantity (also called "remaining pheromone") arranged previously and currently remaining to a corresponding position on a finely divided map. Then, map information of a map where these data are arranged is transmitted to the on-board information terminal 1600, which is provided on a vehicle, being driven along the driving road.

Here, the preset time function means q(t,p) as to be described in the second embodiment. Also, the adjacent area means adjacent information transmission program field as already described in the first embodiment. Time function is a function of the time "t", for instance. Here, the time function may be a preset value or it may be dynamically set. The pheromone is supposed to be 10 when there are 100 persons, for instance. It is 10 in case there are 5 vehicles, and it is 10 when exhaust gas quantity is 10 kg. The range of pheromone may be from 0 to 10 or from 0 to 100, and it is not limited to this. Because the pheromone expressed in numerical value is the same as in the first embodiment, detailed description is not given here. The formulae to calculate the intensity of pheromone at the next time point and (intensity of) time function transmission quantity at the next time point are the same as in the second embodiment, and detailed description is not given here.

The on-board information terminal 1600 predicts traffic quantity at the next time point from the quantity of pheromone (the result of predictive processing) received from the probe car center system 1602 and searches a route to avoid traffic congestion.

6th Embodiment

Figure 17:
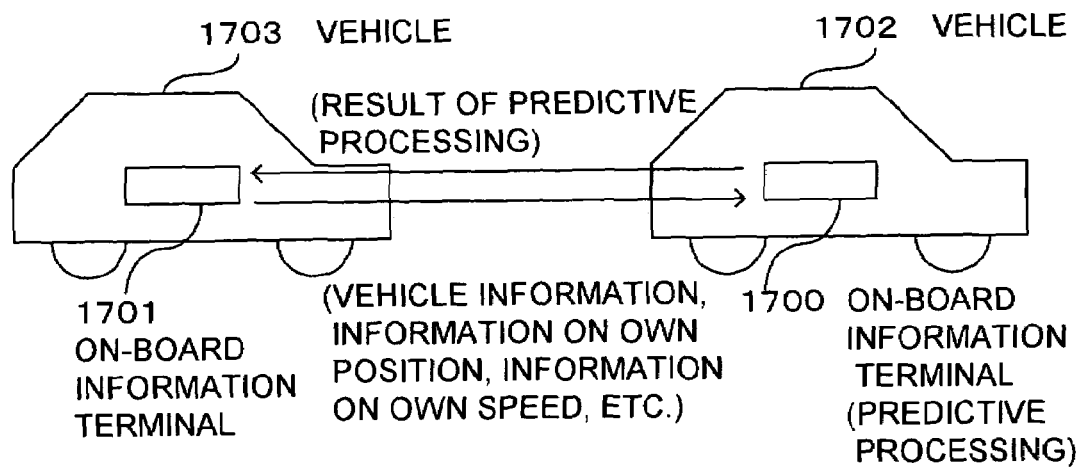
FIG. 17 is a drawing of an information-sharing system according to a sixth embodiment of the present invention.

Next, referring to FIG. 17, description will be given below on an arrangement of an information-sharing system according to a sixth embodiment of the present invention. As shown in FIG. 17, the information-sharing system of the sixth embodiment of the present invention comprises on-board information terminals 1700 and 1701. In the present embodiment, communication is preformed between vehicles. For example, an on-board information terminal provided on a vehicle, which is closer to a crossroad or to a preset point (field) (hereinafter referred as "pheromone field"), is used as a pheromone field server. Predictive processing is performed, and the result of the predictive processing is received by an on-board information terminal on a vehicle in the neighborhood. More concrete description will be given referring to FIG. 17. It is supposed here that a pheromone field server is an on-board information terminal 1700 provided on a vehicle 1702, and a terminal to receive the result of the predictive processing of the pheromone field server is an on-board information terminal 1701 provided on a vehicle 1703. In this case, to the on-board information terminal 1700, which is acting as a pheromone field server, the on-board information terminal 1701 transmits information on its own position, information on traffic condition in the neighborhood, etc. In the description given below, it is described that the on-board information terminals 1700 and 1701 perform processing. However, the processing is actually performed by processing means in each of these systems.

Based on the received information, the on-board information terminal 1700, acting as a pheromone field server, acquires the number of vehicles, number of persons and vehicles, and exhaust gas quantity. The time function existing quantity (also called "generation pheromone") based on time function including the acquired existing quantity is calculated. Then, time function transmission quantity (also called "transmission pheromone") transmitted from adjacent area as time elapses based on the preset time function is calculated. The on-board information terminal 1700 arranges the time function existing quantity, the time function transmission quantity thus calculated and time function remaining quantity (also called "remaining pheromone") arranged previously and currently remaining to a corresponding position on a finely divided map. The map information of a map where these data are arranged is transmitted to the on-board information terminal 1701. Here, the preset time function means q(t,p) as described in the second embodiment. The adjacent area is defined as adjacent information transmitting program field as described in the first embodiment. Here, the preset time function means q(t,p) as to be described in the second embodiment. Also, the adjacent area means adjacent information transmission program field as already described in the first embodiment.

Time function is a function of the time "t", for instance. Here, the time function may be a preset value or it may be dynamically set. The pheromone is supposed to be 10 when there are 100 persons, for instance. It is 10 in case there are 5 vehicles, and it is 10 when exhaust gas quantity is 10 kg. The range of pheromone may be from 0 to 10 or from 0 to 100, and it is not limited to this. Because the pheromone expressed in numerical value is the same as in the first embodiment, detailed description is not given here. The formulae to calculate the intensity of pheromone at the next time point and (intensity of) time function transmission quantity at the next time point are the same as in the second embodiment, and detailed description is not given here.

The on-board information terminal 1701 predicts traffic quantity at the next time point from the quantity of pheromone (the result of predictive processing) received from the on-board information terminal 1700, which is a pheromone field server, and searches a route to avoid traffic congestion.

By the information-sharing system, the information-sharing server, the information-sharing method, and the information-sharing program according to the present invention, it is possible to provide the latest information with high reliability of information up-to-datedness and to delete the information at real time without requiring the troublesome procedure to delete useless information. As a result, these are useful for the application in the information-sharing system, the information-sharing server, the information-sharing method and the information-sharing program, by which the information can be shared among a plurality of users.

What is claimed is:

1. An information-sharing system, comprising an on-board information terminal provided on a vehicle, said on-board information terminal transmits at least one or more types of information among an on-board program information to acquire vehicle information relating to user's own vehicle and a shared information useful for driving of said vehicle;
   an area information acquiring system for acquiring an area information, which is an information on traffic condition on a driving road of said vehicle and in the surrounding of said driving road; and
   an information-sharing server for acquiring number of vehicles and for calculating time function existing quantity based on time function including said acquired existing quantity according to at least one or more types of information among said area information received from said area information acquiring system and said vehicle information received from said on-board information terminal, said information-sharing server further calculates time function transmission quantity to be transmitted to adjacent area as time elapses based on time function including said calculated time function existing quantity, arranges the calculated time function existing quantity and the time function transmission quantity at a corresponding position on a finely divided map, and when said on-board program information is received from said on-board information terminal, map information of said map where said time function existing quantity and said time function transmission quantity are arranged is attached to said on-board program information and is transmitted to said on-board information terminal.

2. The information-sharing system according to claim 1, wherein said area information includes quantity of exhaust gas and information on traffic quantity of pedestrians and other persons; and
   said information-sharing server acquires number of vehicles and quantity of persons, vehicles and exhaust gas based on at least one or more types of information among said vehicle information received from said on-board information terminal and said area information received from said area information acquiring system, and calculates time function existing quantity based on time function including said acquired existing quantity.

3. An information-sharing server, comprising:
   receiving means for receiving at least one or more types of information among a vehicle information on a vehicle from outside, an on-board program information to acquire shared information useful for driving of said vehicle, and an area information, which is an information on traffic quantity on a driving road of said vehicle and in the surrounding of said driving road;
   calculating means for acquiring existing quantity of vehicles based on at least one or more types of information among said vehicle information received by the receiving information means and said area information, calculating time function existing quantity based on time function including said acquired existing quantity, and calculating time function transmission quantity to be transmitted to adjacent area as time elapses based on the time function including said calculated time function existing quantity;
   arranging means for arranging said time function existing quantity and said time function transmission quantity calculated by said calculating means to a corresponding position on a finely divided map;
   attaching means for attaching map information of said map where said time function existing quantity and said time function transmission quantity are arranged by said arranging means to said on-board program information when said on-board program information is received by said receiving means; and
   transmitting means for transmitting said on-board program information, where said map information is attached by said attaching means, to said outside.

4. The information-sharing server according to claim 3, wherein said receiving means receives at least one or more types of information among a vehicle information relating to the vehicle from outside and an on-board program information to acquire shared information useful for driving said vehicle and area information, which is an information on traffic quantity on a driving road of said vehicle and in the surrounding of said driving road and on traffic quantity, exhaust gas existing quantity, and an information on traffic quantity of pedestrians and other persons; and said calculating means acquires existing quantity of vehicles and existing quantity of persons, vehicles and exhaust gas based on at least one or more types of information including said vehicle information and said area information received by said receiving means and calculates time function existing quantity based on time function including said acquired existing quantity.

5. An information-sharing method, comprising the steps of:

receiving at least one or more types of information among a vehicle information relating to a vehicle from outside and on-board program information to acquire shared information useful for driving of said vehicle, and an area information, which is an information on traffic quantity of a driving road of said vehicle and in the surrounding of the driving road;

acquiring existing quantity of vehicles based on at least one or more types of information among said received vehicle information and said area information, calculating time function existing quantity based on time function including said acquired existing quantity, and calculating time function transmission quantity to be transmitted to adjacent area as time elapses based on time function including the calculated time function existing quantity;

arranging said calculated time function existing quantity and said time function transmission quantity to a corresponding position on a finely divided map;

attaching map information of said map, where said time function existing quantity and said time function transmission quantity are arranged, to said on-board program information; and transmitting said on-board program information, where said map information is attached, to said outside.

6. The information-sharing method according to claim 5, wherein said method further comprises the steps of receiving, in said receiving step, at least one or more types of information among a vehicle information relating to a vehicle from outside, an on-board program information to acquire shared information useful for driving of said vehicle, and an area information on traffic quantity on a driving road of said vehicle and in the surrounding of the driving road, existing quantity of exhaust gas, and traffic quantity of pedestrians and other persons; and acquiring, in said calculating step, existing quantity of vehicles or existing quantity of persons, vehicles and exhaust gas based on at least one or more types of information among said received vehicle information and said area information, and calculating time function existing quantity based on time function including said acquired existing quantity.

7. An information-sharing program for instructing a computer to execute the steps of:

receiving at least one or more types of information among a vehicle information relating to a vehicle from outside, an on-board program information to acquire the shared information useful for driving of said vehicle, and an area information, which is an information on traffic quantity of a driving road of said vehicle and in the surrounding of the driving road;

acquiring existing quantity of vehicles based on at least one or more types of information among said received vehicle information and said area information, calculating time function existing quantity based on time function including said acquired existing quantity, and calculating time function transmission quantity to be transmitted to adjacent area as time elapses based on time function including said calculated time function existing quantity;

arranging said calculated time function existing quantity and said time function transmission quantity to a corresponding position on a finely divided map;

attaching map information of said map, where said time function existing quantity and said time function transmission quantity are arranged, to the on-board program information when said on-board program information is received from said outside; and transmitting said on-board program information, where said map information is attached, to said outside.

8. The information-sharing program according to claim 7, wherein said program further comprises the steps of receiving, in said receiving step, at least one or more types of information among a vehicle information relating to the vehicle from outside, an on-board program information to acquire shared information useful for driving of said vehicle, and an area information, which is an information on traffic quantity on a driving road of said vehicle and in the surrounding of said driving road, and traffic quantity existing quantity of exhaust gas and traffic quantity of pedestrians and other persons; and acquiring existing quantity of vehicles or existing quantity of persons, vehicles and exhaust gas based on at least one or more types of information among said received vehicle information and said area information, and calculating time function existing quantity based on time function including said acquired existing quantity.

9. An information-sharing system, comprising:

an information device for transmitting an information device program information to acquire shared information useful for service utilization;

an area information acquiring system to acquire an area information, which is an information of traffic quantity on a driving road of a vehicle and in the surrounding of the driving road; and an information-sharing server for acquiring existing quantity of vehicles based on at least one or more types of information among said area information received from said area information acquiring system, calculating time function existing quantity based on time function including said acquired existing quantity, calculating time function transmission quantity to be transmitted to adjacent area as time elapses based on time function including said calculated time function existing quantity, arranging said calculated time function existing quantity and said time function transmission quantity to a corresponding position on a finely divided map, attaching map information of said map, where said time function existing quantity and said time function transmission quantity are arranged, to said information device program information when said information device program information is received from said information device.

10. The information-sharing system according to claim 9, wherein said area information includes information of exhaust gas existing quantity and traffic quantity of pedestrians and other persons; and said information-sharing server acquires existing quantity of vehicles based on at least one or more types of information among said area information received from said area information acquiring system, acquires existing quantity of the vehicles, and calculates time function existing quantity based on time function including said acquired existing quantity.

11. An information-sharing server, comprising:

receiving means for receiving an information device program, an information to acquire shared information useful for service utilization from outside and an area information, which is an information on traffic quantity on a driving road of the vehicle and in the surrounding;

calculating means for acquiring existing quantity of vehicles based on said area information received by said receiving means, calculating time function existing quantity based on time function including said acquired existing quantity, and calculating time function transmission quantity to be transmitted to adjacent area as time elapses based on time function including said calculated time function existing quantity;

arranging means for arranging said calculated time function existing quantity and said time function transmission quantity calculated by said calculating means to a corresponding position on a finely divided map;

attaching means for attaching map information of said map, where said time function existing quantity and said time function transmission quantity are arranged by said arranging means, to said information device program information; and transmitting means for transmitting said information device program information, where said map information is attached by said attaching means, to said outside.

12. The information-sharing server according to claim 11, wherein said receiving means receives the information device program information to acquire shared information useful for service utilization from outside, and the area information, which is an information on traffic quantity on a driving road of a vehicle and in the surrounding of the driving road, and traffic quantity of pedestrians and other persons; and said calculating means acquires existing quantity of persons, vehicles and exhaust gas based on said area information received by said receiving means and calculates time function existing quantity based on time function including said acquired existing quantity.

13. An information-sharing method, comprising the steps of:

receiving an information device program information to acquire shared information useful for service utilization from outside and an area information, which is an information on a driving road of the vehicle and on traffic quantity in the surrounding of the driving road;

acquiring the existing quantity of vehicles based on said received area information, calculating time function existing quantity based on time function including said acquired existing quantity and time function transmission quantity to be transmitted to adjacent area as time elapses based on time function including said calculated time function existing quantity;

arranging said calculated time function existing quantity and said time function transmission quantity to a corresponding position on a finely divided map;

attaching map information on said map, where said time function existing quantity and said time function transmission quantity are arranged, to said information device program information; and transmitting said information device program information, where said map information is attached, to said outside.

14. The information-sharing method according to claim 13, wherein said method further comprises the steps of receiving, in said receiving step, the information device program information to acquire shared information useful for service utilization from outside and an area information, which is an information on traffic quantity on a driving road of the vehicle and in the surrounding of the driving road and on exhaust gas existing quantity and traffic quantity of pedestrians and other persons; and acquiring, in the calculating step, the existing quantity of persons, vehicles, and exhaust gas based on said received area information, and calculating time function existing quantity based on time function including said acquired existing quantity.

15. An information-sharing program to instruct a computer to execute the steps of:

receiving an information device program information to acquire shared information useful for service utilization from outside and an area information, which is an information on traffic condition on a driving road of a vehicle and in the surrounding of the driving road;

acquiring existing quantity of vehicles based on said received area information, calculating time function existing quantity based on time function including said acquired existing quantity, and calculating time function transmission quantity to be transmitted to adjacent area as time elapses based on time function including said calculated time function existing quantity;

arranging said calculated time function existing quantity and said time function transmission quantity to a corresponding position on a finely divided map;

attaching map information of said map, where said time function existing quantity and said time function transmission quantity are arranged, to said information device program information when said information device program information is received from said outside; and transmitting said information device program information, where said map information is attached, to said outside.

16. The information-sharing program according to claim 15, wherein said program further comprises the steps of receiving, in said receiving step, an information device program to acquire shared information useful for service utilization from outside, and an area information on traffic quantity on a driving road of the vehicle and in the surrounding of the driving road, exhaust gas existing quantity, and traffic quantity of pedestrians and other persons; and acquiring existing quantity of persons, vehicles, and exhaust gas based on said received area information, and calculating time function existing quantity based on time function including said acquired existing quantity.

17. An information-sharing system, comprising:

an area information acquiring system for acquiring an area information, which is an information of traffic quantity on a driving road and in the surrounding of the driving road; and an on-board information terminal for acquiring existing quantity of the vehicles based on said area information acquired by said area information acquiring system, calculating time function existing quantity based on time function including said acquired existing quantity, calculating time function transmission quantity transmitted from adjacent area as time elapses based on a preset time function, and arranging said calculated time function existing quantity, said time function transmission quantity, and time function remaining quantity previously arranged and currently remaining to a corresponding position on a finely divided map.

18. The information-sharing system according to claim 17, wherein
said area information includes exhaust gas existing quantity and traffic quantity of pedestrians and other persons; and
said on-board information terminal acquires existing quantity of vehicles and existing quantity of persons, vehicles, and exhaust gas based on said area information acquired by said area information acquiring system, and calculating time function existing quantity based on time function including said acquired existing quantity.

19. An information-sharing system, comprising:
an on-board information terminal provided on a vehicle for transmitting a vehicle information relating to user's own vehicle;
an area information acquiring system for receiving said vehicle information transmitted by said on-board information terminal, and acquiring an area information, which is an information of traffic quantity on a driving road of said vehicle and in the surrounding of the driving road; and
an information-sharing server for acquiring existing quantity of vehicles based on at least one or more types of information among said vehicle information received from said area information acquiring system and said area information, calculating time function existing quantity based on time function including said acquired existing quantity, calculating time function transmission quantity to be transmitted from adjacent area as time elapses based on a preset time function, arranging said calculated time function existing quantity, said time function transmission quantity, and time function remaining quantity previously arranged and currently remaining to a corresponding position on a finely divided map, and transmitting map information of said arranged map to said on-board information terminal.

20. The information-sharing system according to claim 19, wherein said information-sharing server acquires existing quantity of vehicles and existing quantity of persons, vehicles and exhaust gas based on at least one or more types of information among said vehicle information received from said area information acquiring system and said area information, and calculates time function existing quantity based on time function including said acquired existing quantity.

21. An information-sharing system, comprising:
an on-board information terminal provided on a vehicle to transmit a vehicle information relating to user's own vehicle; and
an area information acquiring system for receiving said vehicle information transmitted by said on-board information terminal, acquiring an area information, which is an information of traffic quantity on a driving road of said vehicle and traffic quantity in the surrounding of the driving road, acquiring existing quantity of vehicles based on at least one or more types of information among said vehicle information and said area information, calculating time function existing quantity based on time function including said acquired existing quantity, calculating time function transmission quantity to be transmitted from adjacent area as time elapses based on a preset time function, arranging said calculated time function existing quantity, said time function transmission quantity and time function remaining quantity previously arranged and currently remaining to a corresponding position on a finely divided map, and transmitting map information of said arranged map to said on-board information terminal.

22. The information-sharing system according to claim 21, wherein said area information acquiring system receives said vehicle information transmitted by said on-board information terminal, acquires an area information, which is an information of traffic quantity on a driving road of said vehicle and in the surrounding of said driving road, acquires existing quantity of vehicles and existing quantity of persons, vehicles and exhaust gas based on at least one or more types of information among said vehicle information and said area information, and calculates time function existing quantity based on time function including said acquired existing quantity.

23. An information-sharing system, comprising:
an area information providing terminal for acquiring an area information, which is an information on traffic quantity on a driving road of a vehicle and in the surrounding of the driving road; and
an information providing server for acquiring existing quantity of vehicles based on said area information transmitted from said area information providing terminal, calculating time function existing quantity based on time function including said acquired existing quantity, calculating time function transmission quantity transmitted from adjacent area as time elapses based on a preset time function, arranging said calculated time function existing quantity, said time function transmission quantity and time function remaining quantity previously arranged and current remaining to a corresponding position on a finely divided map, and transmitting map information of said map where the data are arranged to an on-board information terminal provided on the vehicle being driven on said driving road.

24. The information-sharing system according to claim 23, wherein said area information providing terminal acquires an area information, which is an information of traffic quantity on a driving road of the vehicle and in the surrounding of the driving road, and traffic quantity of pedestrians and other persons, and transmits said acquired area information to outside; and
said information providing server acquires existing quantity of the vehicles and existing quantity of persons, vehicles and exhaust gas based on said area information transmitted from said area information providing terminal, and calculating time function existing quantity based on time function including said acquired existing quantity.

25. An information-sharing system, comprising:
an on-board information terminal provided on a vehicle to transmit a vehicle information relating to user's own vehicle; and
an information providing terminal provided on another vehicle other than said vehicle and for receiving said vehicle information transmitted from said on-board information terminal in case said another vehicle is driven in a predetermined area, acquires existing quantity of the vehicles based on said vehicle information, calculates time function existing quantity based on time function including said acquired existing quantity, calculates time function transmission quantity to be transmitted from adjacent area as time elapses based on a preset time function, arranges said calculated time function existing quantity, said time function transmission quantity, and time function remaining quantity previously arranged and currently remaining to a corresponding position on a finely divided map, and transmits map information of said map, where the data are arranged, to said on-board information terminal.

26. The information-sharing system according to claim 25, wherein said information providing terminal is provided on a vehicle other than said vehicle, receives said vehicle information transmitted from said on-board information terminal in case said other vehicle is driven in a predetermined area, acquires existing quantity of the vehicles or existing quantity of persons, vehicles and exhaust gas, and calculates time function existing quantity based on time function including said acquired existing quantity.

* * * * *